US009032365B2

(12) United States Patent
Suzuki

(10) Patent No.: US 9,032,365 B2
(45) Date of Patent: May 12, 2015

(54) SCRIPT DESCRIPTION SEPARATION RECONSTRUCTING DEVICE, SCRIPT DESCRIPTION SEPARATION RECONSTRUCTING METHOD, AND NON-TRANSITORY COMPUTER READABLE MEDIUM STORING SCRIPT DESCRIPTION SEPARATION RECONSTRUCTING PROGRAM

(75) Inventor: Noriaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 13/256,705

(22) PCT Filed: Mar. 24, 2010

(86) PCT No.: PCT/JP2010/002081
§ 371 (c)(1),
(2), (4) Date: Sep. 15, 2011

(87) PCT Pub. No.: WO2010/134250
PCT Pub. Date: Nov. 25, 2010

(65) Prior Publication Data
US 2012/0011488 A1 Jan. 12, 2012

(30) Foreign Application Priority Data

May 22, 2009 (JP) ................. 2009-124159

(51) Int. Cl.
G06F 9/44 (2006.01)
G06F 11/36 (2006.01)
G06F 9/455 (2006.01)

(52) U.S. Cl.
CPC .......... *G06F 11/362* (2013.01); *G06F 9/45512* (2013.01)

(58) Field of Classification Search
USPC .................................. 717/114, 115
See application file for complete search history.

(56) References Cited

U.S. PATENT DOCUMENTS

| 5,428,525 | A  | * | 6/1995  | Cappelaere et al. | ............ 700/49 |
| 6,401,102 | B1 | * | 6/2002  | Ishii et al.      | ............ 709/203 |
| 6,819,754 | B1 | * | 11/2004 | Johnson et al.    | ........ 379/265.02 |
| 6,886,024 | B1 | * | 4/2005  | Fujita et al.     | ............ 709/201 |

(Continued)

FOREIGN PATENT DOCUMENTS

| JP | 4-44181 A   | 2/1992  |
| JP | 6-332828 A  | 12/1994 |

(Continued)

OTHER PUBLICATIONS

International Search Report for PCT/JP2010/002081 mailed Jun. 29, 2010.

*Primary Examiner* — Li B Zhen
*Assistant Examiner* — Viva Miller
(74) *Attorney, Agent, or Firm* — Sughrue Mion, PLLC

(57) ABSTRACT

An object is to provide a script description separation reconstructing device that can describe the same operation by the same command script regardless of a subsystem configuration of a controlled system, a configuration of a control system, and a kind of the command script. Using system configuration information indicating what kind of subsystem structure the controlled system is composed of, A script description separation reconstructing means reconstructs in a form of separating a system control command script description into a process inside each controller and a process by a host side.

12 Claims, 27 Drawing Sheets

(56) References Cited

U.S. PATENT DOCUMENTS

| | | | |
|---|---|---|---|
| 6,907,546 B1* | 6/2005 | Haswell et al. | 714/38.11 |
| 7,089,066 B2* | 8/2006 | Hesse et al. | 700/2 |
| 7,712,088 B2* | 5/2010 | Sonkin et al. | 717/136 |
| 7,861,174 B2* | 12/2010 | Krasnoiarov et al. | 715/736 |
| 2002/0156812 A1* | 10/2002 | Krasnoiarov et al. | 707/513 |
| 2003/0131146 A1* | 7/2003 | Lam et al. | 709/320 |
| 2004/0215778 A1* | 10/2004 | Hesse et al. | 709/226 |
| 2005/0149582 A1* | 7/2005 | Wissmann et al. | 707/201 |
| 2006/0010123 A1* | 1/2006 | Sonkin et al. | 707/4 |
| 2006/0271204 A1* | 11/2006 | Hesse et al. | 700/2 |
| 2007/0156384 A1* | 7/2007 | Plunkett | 703/23 |
| 2008/0133687 A1* | 6/2008 | Fok et al. | 709/207 |
| 2011/0178946 A1* | 7/2011 | Minert et al. | 705/346 |

FOREIGN PATENT DOCUMENTS

| | | |
|---|---|---|
| JP | 2001344127 A | 12/2001 |
| JP | 2004118374 A | 4/2004 |
| JP | 2008165683 A | 7/2008 |

\* cited by examiner

- CONTROLLER CONFIGURATION
  - CONTROLLER A: SIMPLE PROCESS
  - CONTROLLER B: SIMPLE PROCESS

- SUBSYSTEM CONFIGURATION
  - SUBSYSTEM A: CONTROLLER A
  - SUBSYSTEM B: CONTROLLER B

- CORE CONFIGURATION
  - CORE A: SUBSYSTEM A
  - CORE B: SUBSYSTEM B

- VARIABLE
  - VARIABLE a: SUBSYSTEM A
  - VARIABLE b: SUBSYSTEM B
  - VARIABLE c: SUBSYSTEM A OR SUBSYSTEM B

Fig. 7

1. CONTROLLER A AND B (INPUT: SUBSYSTEM)
2. CONTROLLER A (OUTPUT: VARIABLE)
3. CONTROLLER B (OUTPUT: VARIABLE)
4. CONTROLLER A OR B (OUTPUT: VARIABLE)
5. CONTROLLER A AND B (OUTPUT: SUBSYSTEM)

- CONTROLLER CONFIGURATION
    - CONTROLLER A: ADVANCED PROCESS

- SUBSYSTEM CONFIGURATION
    - SUBSYSTEM A: CONTROLLER A
    - SUBSYSTEM B: CONTROLLER A

- CORE CONFIGURATION
    - CORE A: SUBSYSTEM A
    - CORE B: SUBSYSTEM B

- VARIABLE
    - VARIABLE a: SUBSYSTEM A
    - VARIABLE b: SUBSYSTEM B
    - VARIABLE c: SUBSYSTEM A OR SUBSYSTEM B

Fig. 14

```
                                82
                               ┌─┴─┐
┌─────────────────────────────────────────────────────────────┐
│                                                             │
│ ·CONTROLLER CONFIGURATION                                   │
│           ·CONTROLLER A: SIMPLE PROCESS                     │
│                                                             │
│ ·SUBSYSTEM CONFIGURATION                                    │
│           ·SUBSYSTEM A: CONTROLLER A                        │
│                                                             │
│ ·CORE CONFIGURATION                                         │
│           ·CORE A: SUBSYSTEM A                              │
│           ·CORE B: SUBSYSTEM A                              │
│                                                             │
│ ·VARIABLE                                                   │
│           ·VARIABLE a: SUBSYSTEM A                          │
│           ·VARIABLE b: SUBSYSTEM A                          │
│           ·VARIABLE c: SUBSYSTEM A                          │
│                                                             │
└─────────────────────────────────────────────────────────────┘
```

Fig. 17

```
                                82
                               ┌─┴─┐
┌─────────────────────────────────────────────────────────────┐
│                                                             │
│ ·CONTROLLER CONFIGURATION                                   │
│           ·CONTROLLER A: ADVANCED PROCESS                   │
│                                                             │
│ ·SUBSYSTEM CONFIGURATION                                    │
│           ·SUBSYSTEM A: CONTROLLER A                        │
│                                                             │
│ ·CORE CONFIGURATION                                         │
│           ·CORE A: SUBSYSTEM A                              │
│           ·CORE B: SUBSYSTEM A                              │
│                                                             │
│ ·VARIABLE                                                   │
│           ·VARIABLE a: SUBSYSTEM A                          │
│           ·VARIABLE b: SUBSYSTEM A                          │
│           ·VARIABLE c: SUBSYSTEM A                          │
│                                                             │
└─────────────────────────────────────────────────────────────┘
```

Fig. 18

SCRIPT DESCRIPTION SEPARATION RECONSTRUCTING DEVICE, SCRIPT DESCRIPTION SEPARATION RECONSTRUCTING METHOD, AND NON-TRANSITORY COMPUTER READABLE MEDIUM STORING SCRIPT DESCRIPTION SEPARATION RECONSTRUCTING PROGRAM

TECHNICAL FIELD

The present invention relates to a script description separation reconstructing device, a script description separation reconstructing method, and a non-transitory computer readable medium storing a script description separation reconstructing program in a control device that controls a controlled system composed of at least one or more subsystems using a system control command script.

BACKGROUND ART

In recent years, each enterprise or the like manufactures and provides various varieties of various systems represented by an embedded system or an industrial system etc. Therefore, there are statuses generated in which a plurality of systems can be used for the same purpose. Further, more functions can be added to these systems in addition to existing functions by replacement to a latest system at that point in accordance with the update time of the system.

On the other hand, these systems are composed according to different specification for each system. Therefore, it has been necessary for the controller that controls such system to correct a control procedure for each system even when attempting to perform the same operation. That is, when the controlled system connected to the controller differs, the controller needs to change the command script according to the specification of the controlled system.

A controller disclosed in PTL 1 previously includes, as shown in FIG. 29, a driver common to a model similar to the controlled system, and the controlled system includes protocol data for absorbing a difference between the models similar to the controlled system. As information necessary in order to absorb the difference in the models, the protocol data includes (1) BUSY value, (2) TIMEOUT value, and (3) STOROBE value of this controlled system in addition to definition information indicating a command number of the process to be executed in this controlled system.

The controller disclosed in PTL 1 transmits a control signal to the controlled system at an interval indicated by the BUSY value according to the protocol data. After this controller transmits the control signal to the controlled system, even when the time indicated by the TIMEOUT value of the protocol data has passed, when a response of the control signal is not received from this controlled system, the controller detects an anomaly of this controlled system. Further, the controller continuously transmits the control signals indicated by the STOROBE value to the controlled system according to this protocol data. By the abovementioned series of processes, the controller can control the controlled system without rewriting its own program.

CITATION LIST

Patent Literature

Japanese Unexamined Patent Application Publication No. 2008-165683

SUMMARY OF INVENTION

Technical Problem

However, there is a following problem in the controller and the controlled system disclosed in PTL 1. The command script used by the controlled system composed of a single system cannot be utilized for the controlled system composed of a combination of a plurality of subsystems depending on the controller and the controlled system disclosed in PTL 1. This problem is caused that although the control system composed of a plurality of controllers is used in general along with the controlled system that is composed of a plurality of subsystems, in order to perform the same control as the command script used in the controlled system composed of a single system by cooperating the plurality of controllers, the command script specially composed to perform the same control in the entire control system must be prepared for each controller. A similar problem is generated when utilizing the command script for the controlled system composed of a plurality of subsystems to the controlled system of a different configuration composed of a plurality of subsystems or the controlled system composed of a single system.

The present invention is made to solve such problem, and an object is to provide a script description separation reconstructing device, a script description separation reconstructing method, and a non-transitory computer readable medium storing a script description separation reconstructing program that can describe the same operation by the same command script regardless of a subsystem configuration of a controlled system and a configuration of a control device, and a kind of the command script.

Solution to Problem

An exemplary aspect of the script description separation reconstructing device according to the present invention includes script description separation reconstructing means that refers to system configuration information of a controlled system composed of at least one or more subsystems and a control device for controlling the controlled system, separates a system control command script description for controlling the controlled system into a code for host indicating a process in a host that performs a basic process in the control system and a code for controller indicating a process in the controller that controls the controlled system, and reconstructs the system control command script description.

An aspect of a script description separation reconstructing method according to the present invention includes referring to system configuration information of a controlled system composed of at least one or more subsystems and a control device for controlling the controlled system, separating a system control command script description for controlling the controlled system into a code for host indicating a process in a host that performs a basic process in the control system and a code for controller indicating a process in the controller that controls the controlled system, and reconstructing the system control command script description.

An aspect of a non-transitory computer readable medium storing a program for processing a system control command script description according to the present invention that controls a controlled system, in which the process is to refer to system configuration information of a controlled system composed of at least one or more subsystems and a control device for controlling the controlled system, separate a system control command script description for controlling the controlled system into a code for host indicating a process in a host that performs a basic process in the control system and a code for controller indicating a process in the controller that controls the controlled system, and reconstruct the system control command script description.

Advantageous Effects of Invention

According to the present invention, it is possible to provide a script description separation reconstructing device, a script description separation reconstructing method, and a non-transitory computer readable medium storing a script description separation reconstructing program that can describe the same operation by the same command script regardless of a subsystem configuration of a controlled system, a configuration of a control device, or a kind of the command script.

BRIEF DESCRIPTION OF DRAWINGS

FIG. 7 is system configuration information 82 in the first example of the configuration of the controlled system 1 according to the first exemplary embodiment;

FIG. 8 is attribute information 71 in the first example of the configuration of the controlled system 1 according to the first exemplary embodiment;

FIG. 14 is system configuration information 82 in the third example of the configuration of the controlled system 1 according to the first exemplary embodiment;

FIG. 17 is the system configuration information 82 in the configuration example of the controlled system 1 according to the first exemplary embodiment;

FIG. 18 is system configuration information 82 in the configuration example of the controlled system 1 according to the first exemplary embodiment;

DESCRIPTION OF EMBODIMENTS

First Exemplary Embodiment

Hereinafter, exemplary embodiments of the present invention are described with reference to the drawings.

Figure 1:
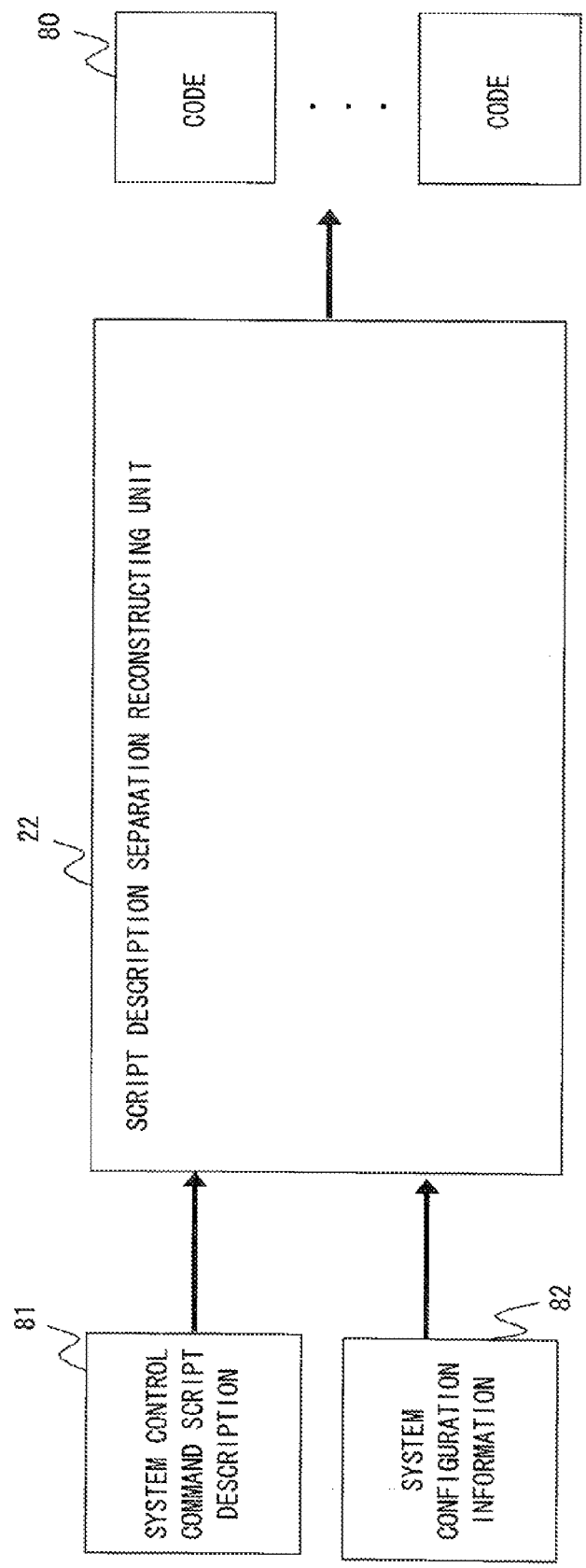
FIG. 1 is a block diagram showing an outline of a script description separation reconstructing device according to a first exemplary embodiment.

First, an overview of a system configuration of a script description separation reconstructing device according to a first exemplary embodiment of the present invention is described using FIG. 1. FIG. 1 is a block diagram showing an overview of the script description separation reconstructing device according to the first exemplary embodiment. A system control command script description 81 of this exemplary embodiment is the one in which the description to control a controlled system is defined in an integrated notation regardless of a configuration of a controlled system and a control device. Information representing the configuration of the controlled system and the control device is described in system configuration information 82. The system configuration information 82 includes information concerning the subsystem configuration of the controlled system, information concerning a controller, and information indicating the controller to which each component of the controlled system is connected. The details of the system configuration information 82 are described later. The script description separation reconstructing unit 22 outputs a code 80 which is processed in the process inside the controller and in the host side by inputting the system control command script description 81 and the system configuration information 82, and separating and reconstructing the system control command script description 81.

Note that the script description separation reconstructing device is explained as a software program realized by causing a CPU to execute a computer program. Further, the computer program executed by the CPU can be stored and provided using a recoding medium, and furthermore, it can be provided by transmitting via the Internet and other communication media. Moreover, non-transitory computer readable media include, for example, flexible disks, hard disk drives, magnetic disks, magneto-optical disks, CD-ROM, DVD, ROM cartridge, RAM memory cartridge with battery backup, flash memory cartridge, and non-volatile RAM cartridge, etc. Additionally, communication media include wired communication media such as telephone lines, and wireless communication media or the like such as microwave lines.

Figure 2:
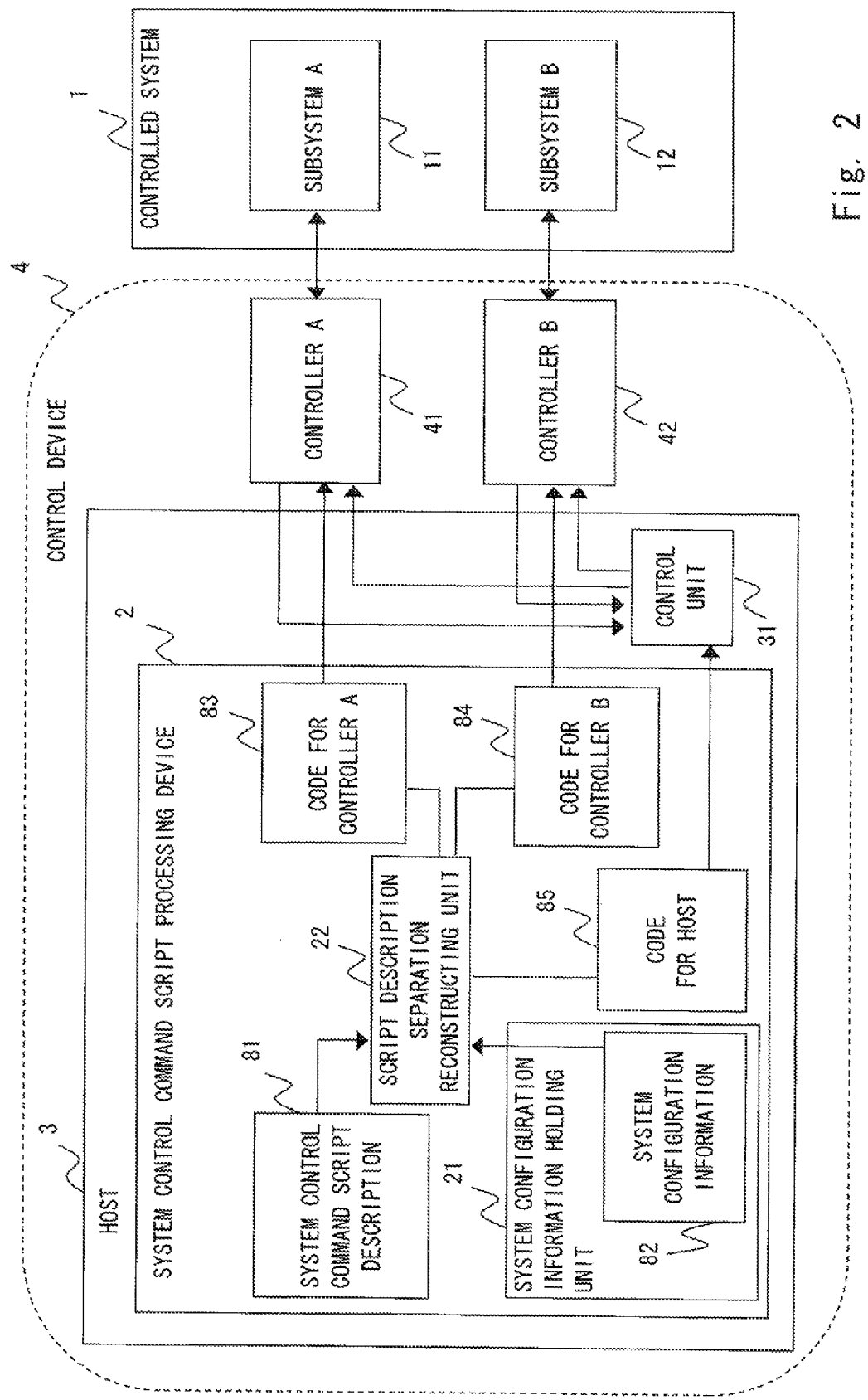
FIG. 2 is a block diagram showing a configuration according to the first exemplary embodiment.

Next, the details of the control system in the first exemplary embodiment of the present invention are shown using FIG. 2. FIG. 2 is a block diagram showing the details of the entire configuration of the control system in the first exemplary embodiment of the present invention. FIG. 2 shows a controlled system 1 to be controlled, and a control device 4 for controlling the controlled system 1. The control device 4 includes a host 3, which will be a base of the control device 4. The host 3 includes a system control command script processing device 2 and a control unit 31. The controlled system 1 further includes a subsystem A11 and a subsystem B12, and inside the control device 4, a controller A41 and a controller B42 for controlling each subsystem are included. The system control command script processing device 2 and the control unit 31 operate on the host 3. Further, the system control command script processing device 2 includes a system configuration information holding unit 21 and a script description separation reconstructing unit 22.

Next, the system control command script description 81 processed by the system control command script processing device 2 of this exemplary embodiment, and the system configuration information 82 are explained.

In the system control command script description 81, a control procedure of the controlled system 1 is described by an integrated notation regardless of the configuration of the controlled system 1 and the control device 4. The system control command script description 81 includes an output description which operates the system, and an input description which is used for an evaluation condition or the like for executing the output description. The output description includes a description or the like which stops the operation of the controlled system 1, performs execution control such as resuming execution, controls the control device 4, and changes values of registers and variables. The input description includes a description which obtains the state of the controlled system 1 and the control unit 4, and a description which obtains event information indicating that a particular operation in the controlled system 1 is detected. Moreover, the system control command script description 81 includes the output description and the input description, and also includes a description of a condition judgment or the like as necessary.

The system configuration information 82 represents the configuration of the controlled system 1 and the control unit 4. The system configuration information 82 includes information indicating what kind of subsystem the controlled system 1 is composed of, information concerning the configuration of the control device 4, information concerning the controller, and information indicating which controller the subsystem and each resource in the subsystem belongs thereto.

Next, the details of each part composing the control system in the first exemplary embodiment are explained. The system configuration information holding unit 21 holds the system configuration information 82.

The script description separation reconstructing unit 22 uses the system configuration information 82 held by the system configuration information holding unit 21, separates the system control command script description 81 into the process inside each controller, and the process by the host and reconstructs it. The script description separation reconstructing unit 22 outputs a code for each controller (a code for controller A 83 and a code for controller B 84 in FIG. 2) and a code for host 85.

The control unit 31 executes the code for host 85 among the output codes of the script description separation reconstructing unit 22, performs transmission and reception of a control instruction to the controller A41 and the controller B42, performs transmission and reception of an operation status, and operates the entire control device, in order to control the controlled system 1.

The controller A41 inside the control device 4 cooperates and operates with the instruction from the control unit 31 based on the code for controller A 83 among the output codes of the script description separation reconstructing unit 22, and controls the subsystem A11. The controller B42 inside the control device 4 cooperates and operates with the instruction from the control unit 31 based on the code for controller B 84 among the output codes of the script description separation reconstructing unit 22, and controls the subsystem A12.

Figure 3:
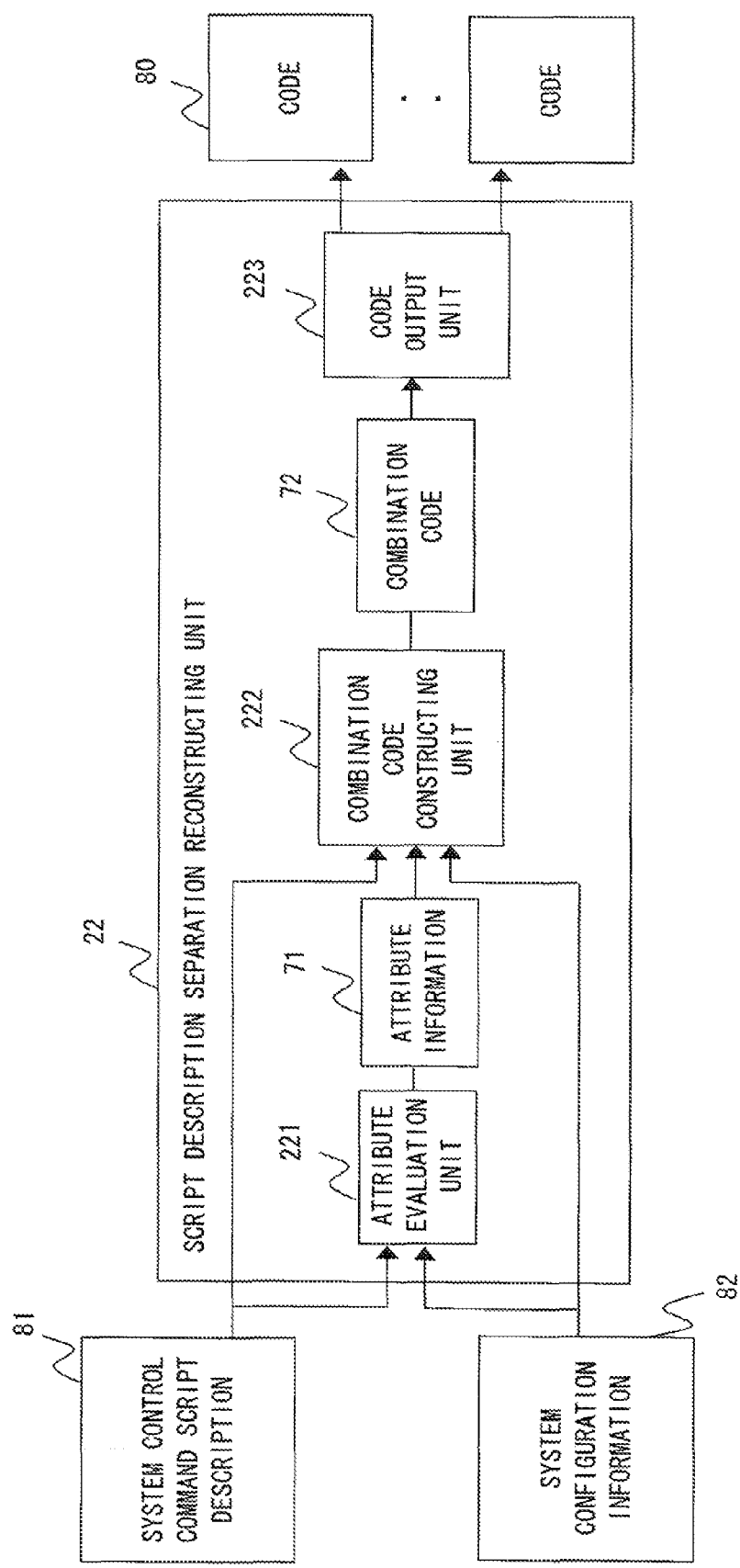
FIG. 3 is a block diagram showing a configuration of a script description separation reconstructing unit 22 according to the first exemplary embodiment.

Next, the details of the script description separation reconstructing unit 22 are explained using FIG. 3. FIG. 3 is a block diagram showing the configuration of the script description separation reconstructing unit 22. The script description separation reconstructing unit 22 includes an attribute evaluation unit 221, a combination code construction unit 222, and a code output unit 223.

The attribute evaluation unit 221 inputs the system control command script description 81, and outputs attribute information 71 of each line of the system control command script description 81 using the system configuration information 82. The attribute information 71 is composed of information of whether each line of the system control command script description 81 is an input or an output, or what is the target or the input and output (the subsystem, the controller, the variable or the like).

The combination code construction unit 222 performs reconstruction using the attribute information 71 by expressing the system control command script description 81 with combination of the process in each controller and the process in the host. The combination code construction unit 222 combines these and outputs this as a combination code 72. At the time of the reconstruction, the combination code construction unit 222 automatically categorizes the system control command script description 81 into a local action in which the process closes inside the controller or the control unit and a global action which requires the process over a plurality of controllers or control units.

The combination code construction unit 222 performs categorization as the local action when a generator of the input used as the condition for executing the output description and a target of the output description is the same controller or inside the control unit. Note that especially, for example, when the controller does not include a sequencer, even if the treatment as the local action is essentially desirable, the controller which requires the process by the host side exists. In this case, it is categorized as the global action regardless of whether it is in the range that can be categorized as the local action. The section categorized as the local action is dealt as the process in the controller or the host as it is. The section categorized as the global action is reconstructed in a form that it is further separated into the process in the controller and the process by the host side. Here, at the time of separating into the process in the controller and the process of the host, the combination code construction unit 222 complements the communication process and synchronization process as necessary so that the whole may operate according to the procedure of the system control command script description 81.

The code output unit 223 separates the combination code 72 for each controller and host, and outputs it as the code 80. The code 80 here is equivalent to the code for controller A 83, the code for controller B 84, and the code for host 85 in FIG. 2. The code output for each controller includes a description categorized as the local action of each controller and the process or the like inside the controller reconstructed among the global action.

Note that the controlled system 1 is a system composed of two, which are the subsystem A11 and the subsystem B12, however the script description separation reconstructing device of this exemplary embodiment can be easily extended to the system corresponding to the controlled system composed of any number of subsystems. Further, in FIG. 2, although the controller A41 and the controller B42 for the subsystem A and the subsystem B are composed separately from the host 3, it may be a configuration of including them inside the host 3 by a method of composing it as software for the host 3, or may be composed as a part inside the controlled system 1.

Figures 4, 5:
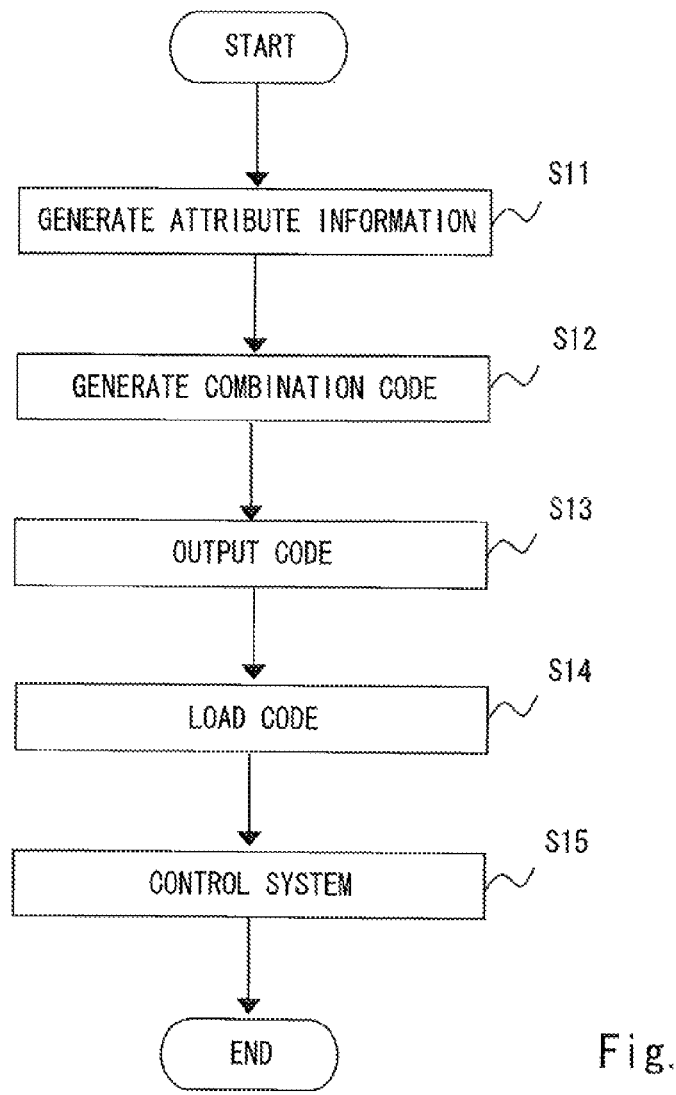
FIG. 4 is a flowchart showing a process flow of a system controller according to the first exemplary embodiment.
FIG. 5 is a description example of a system control command script description 81 according to the first exemplary embodiment.

Next, an operation of the processing system according to this exemplary embodiment is explained using the flowchart of FIG. 4.

The attribute evaluation unit 221 outputs the attribute information 71 of the descriptive content of each line of the system control command script description 81 using the system configuration information 82 (S11). The combination code construction unit 222 performs reconstruction by expressing the system control command script description 81 with combination of the process in each controller and the process by the host using the attribute information 71. This is output as the combination code 72 (S12). Lastly the code output unit 223 outputs the process by the controller A41 side as the code for controller A 83, the process by the controller B42 side as the code for controller B 84, and the process by the host side as the code for host 85 (S13).

After that, the system is actually operated (S14, S15). Firstly, the code for controller A 83 and the code for controller B 84 are loaded respectively on the controller A 41 and the controller B42 inside the control device 4. Moreover, the code for host 85 is loaded on the control unit 31 (S14). Then, at the stage of operating the system, the controller A41 and the controller B42 cooperate and operate with the instructions from the control unit 31 (S15).

Next, the details of the operation of the system control command script processing system are explained, using the case of FIG. 5 as an example of the system control command script 81. Here, in the controlled system 1 including a core A13 and a core B14, after waiting for the execution stop of both the core A13 and the core B14, values of a variable a, a variable b, and a variable c are changed and execution of the core A13 and the core B14 is resumed. In FIG. 5, although the system control command script 81 is written in natural language for explanation, it is actually written in scripting language.

Figure 6:
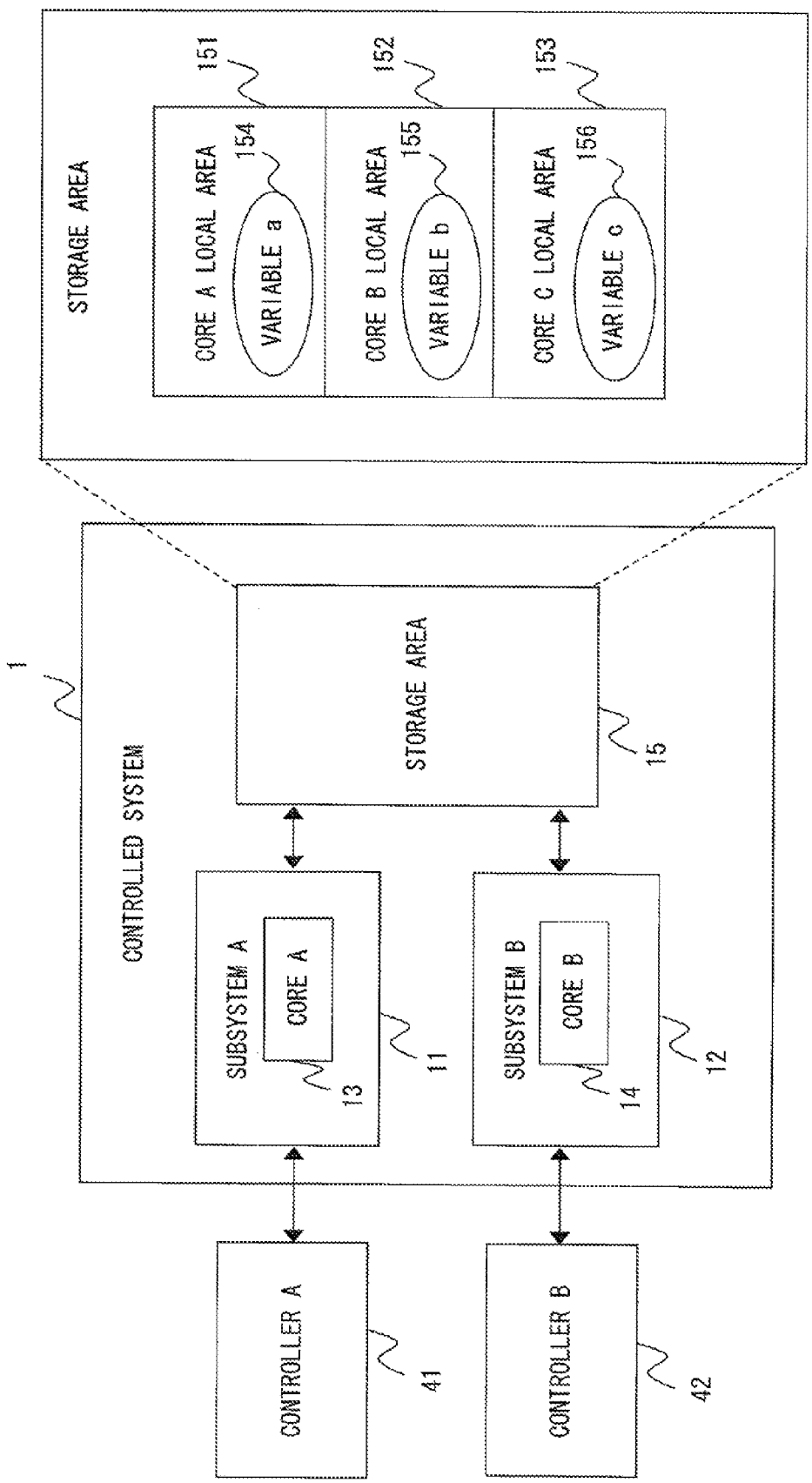
FIG. 6 is a first example of a configuration of a controlled system 1 according to the first exemplary embodiment.

As a first example of the configuration of the controlled system 1, there is the one shown in FIG. 6. The controlled system 1 of FIG. 6 is composed of the controller A41 for controlling the subsystem A11, the controller B42 for controlling the subsystem B12, and a storage area 15. Further, the subsystem A11 includes the core A13, and the subsystem B12 includes the core B14. Additionally, the storage area 15 includes a variable a154 of a memory area 151 dedicated for the core A13, a variable b155 of a memory area 152 dedicated for the core B12, and a variable c156 of a shared memory area 153 which can be read and written from and to both of the core A11 and the core B12.

Firstly, the attribute evaluation unit 221 outputs the attribute information 71 of FIG. 8 using the system configuration information 82 of FIG. 7 from the system control command script description 81 of FIG. 5. Here the system configuration information 82 of FIG. 7 indicates that the control device 4 is composed of two, which are the controller A and the controller B, both the controller A and the controller B can only perform simple processes, the subsystem configuration of the controlled system 1 is composed of two, which are the subsystem A and the subsystem B, the subsystem A is controlled by the controller A and the subsystem B is controlled by the controller B, the controlled system 1 includes the core A and the core B however the core A is included in the subsystem A, the core B is included in the subsystem B, and the variables a, b, and c can be respectively accessed from the core A, the core B, and core A or the core B.

The attribute information 71 of FIG. 8 indicates that the first line of the system control command script description 81 performs input via the controller A and the controller B from the subsystem A and the subsystem B, the second line performs output via the controller A to the variables, the third line performs output via the controller B to the variables, the fourth line performs output via either the controller A or the controller B to the variables, and the fifth line performs output via the controller A and the controller B to the subsystem.

Figure 9A:
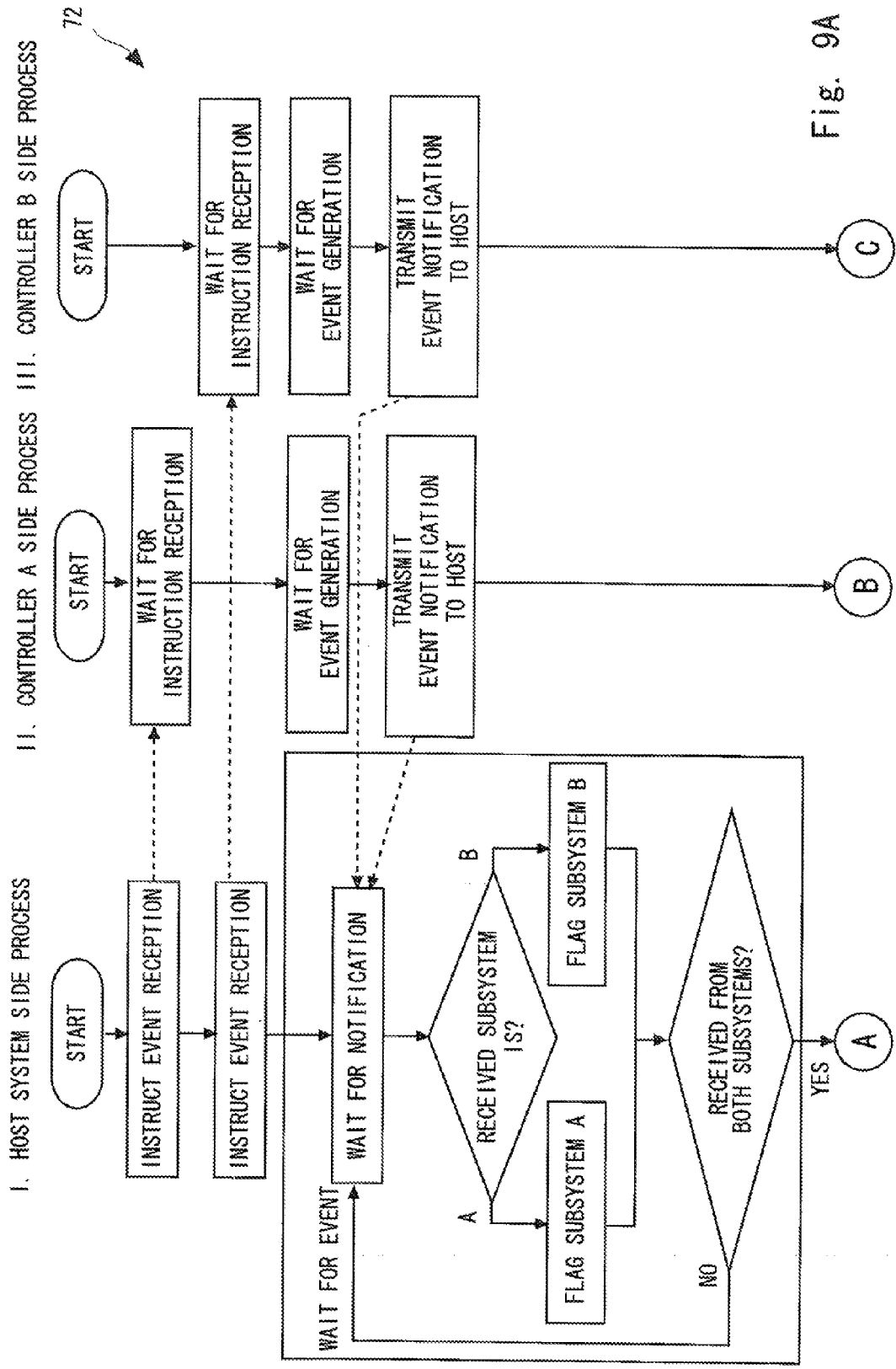
FIG. 9A is a combination code 72 in the first example of the configuration of the controlled system 1 according to the first exemplary embodiment.
Figure 9B:
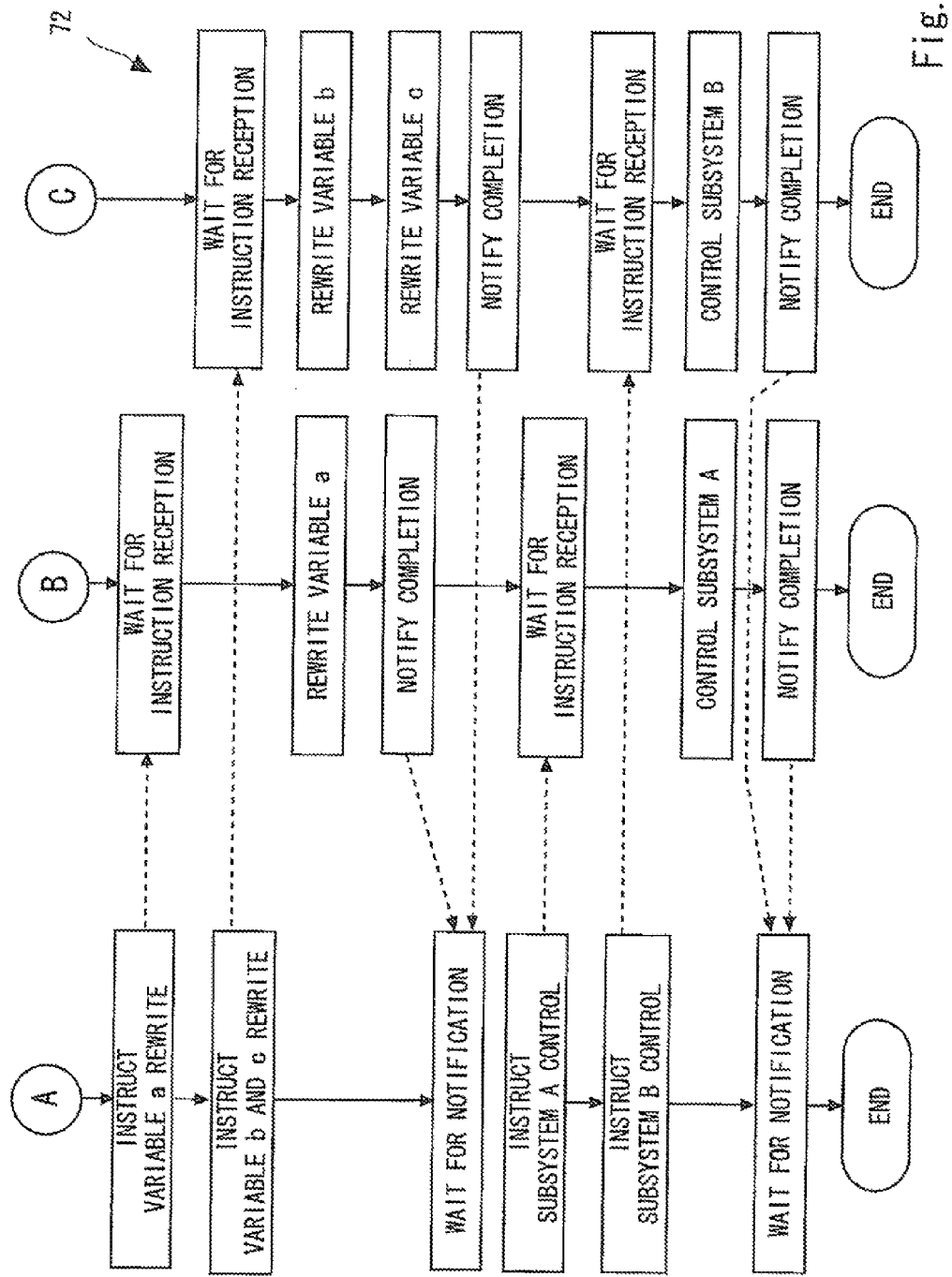
FIG. 9B is the combination code 72 in the first example of the configuration of controlled system 1 according to the first exemplary embodiment.

Next, the combination code construction unit 222 performs reconstruction by expressing the system control command script description 81 of FIG. 5 with combination of the process in each controller and the process in the host using the system configuration information 82 and the attribute information 71, and outputs the combination code 72 as shown in FIG. 9. Note that although the combination code 72 is written in the form of the drawing, the combination code 72 is actually output in a form that is easy for computer processes. Hereinafter, the combination code 72 shown in FIG. 9 is explained.

The process to wait for a stop of both of the core A and the core B in the first line of the system control command script description 81 is reconstructed to a stop event waiting process by the controller A and the controller B side, an event notification transmission process to the host, and a notification waiting process by the host side, since the first line of the attribute information 82 is an input from both of the controller A and the controller B.

Next, a rewrite process of the variable a in the second line of the system control command script description 81 is reconstructed to a variable a rewrite instruction transmission process by the host side, an instruction reception waiting process, and a variable a rewrite process by the controller A side, since the attribute information 82 is an output to the controller A. Note that the third and the fourth line of the system control command script description 81 are reconstructed in a similar manner. Here, as the process in the fourth line of the system control command script description 81 can be processed by both of the controller A and the controller B, an improvement in the efficiency is expected by dealing in series with the process in the third line.

Lastly the process in the fifth line of the system control command script description 81 is an output process to the controller A or the controller B. Here, an output target of the process from the second to the fourth line of the system control command script description 81 is a variable, however the output target, of the process in the fifth line is the subsystem, that is, the purpose is to control the subsystem. Accordingly, the process to wait for the process up to the fourth line to complete once is added. After waiting for the completion, the process in the fifth line is reconstructed to control instruction transmission to the controller A and the controller B by the host side, instruction reception wait by the controller side, and the subsystem control process.

After this, the code output unit 223 outputs FIG. 9I, which is the process by the host side, as the code for host 85, FIG. 9II, which is the process of the controller A51 for controlling the subsystem A11, as the code for controller A 83, and FIG. 9III, which is the process of the controller B42 for controlling the subsystem B12, as the code for controller B 84.

Figure 10:
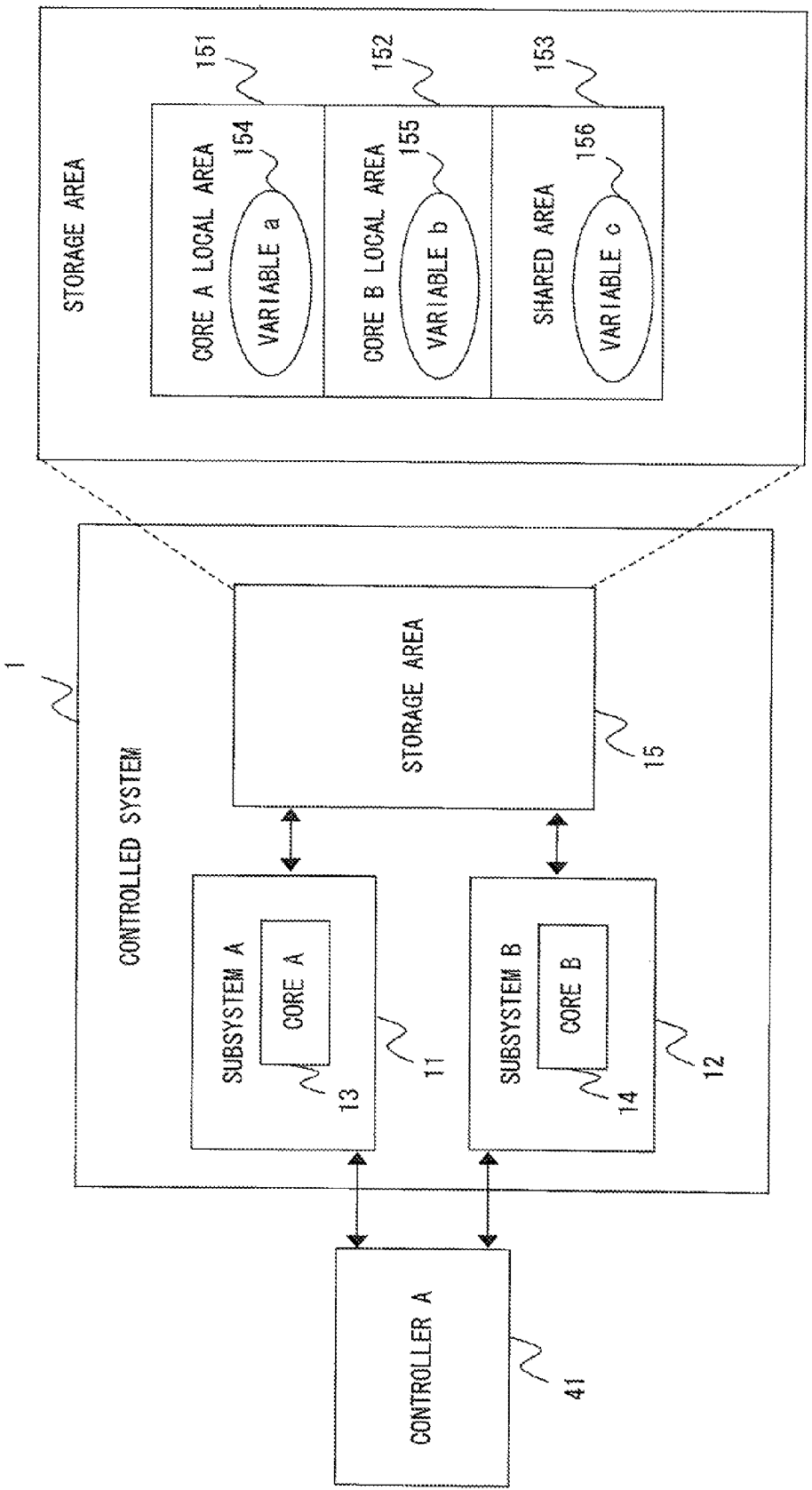
FIG. 10 is a second example of a configuration of the controlled system 1 according to the first exemplary embodiment.

As a second example of the configuration of the controlled system 1, there is the one shown in FIG. 10. The controlled system 1 of FIG. 10 has a configuration of controlling both of the subsystem A11 and the subsystem B12 by the controller A41. The control system 1 also includes the storage area 15. Further, the subsystem A11 includes the core A13, and the subsystem B12 includes the core B14. Additionally, the storage area 15 includes the variable a154 of the memory area 151 dedicated for the core A13, the variable b155 of the memory area 152 dedicated for the core B12, and the variable c156 of the shared memory area 153 which can be read and written from and to both of the core A11 and the core B12.

Figure 11:
FIG. 11 is system configuration information 82 in the second example of the configuration of the controlled system 1 according to the first exemplary embodiment.
Figure 12:
FIG. 12 is attribute information 71 in the second and a third example of the configuration of the controlled system 1 according to the first exemplary embodiment.

Firstly, the attribute evaluation unit 221 outputs the attribute information 71 of FIG. 12 from the system control command script description 81 of FIG. 5 using the system configuration information 82 of FIG. 11.

Figure 13A:
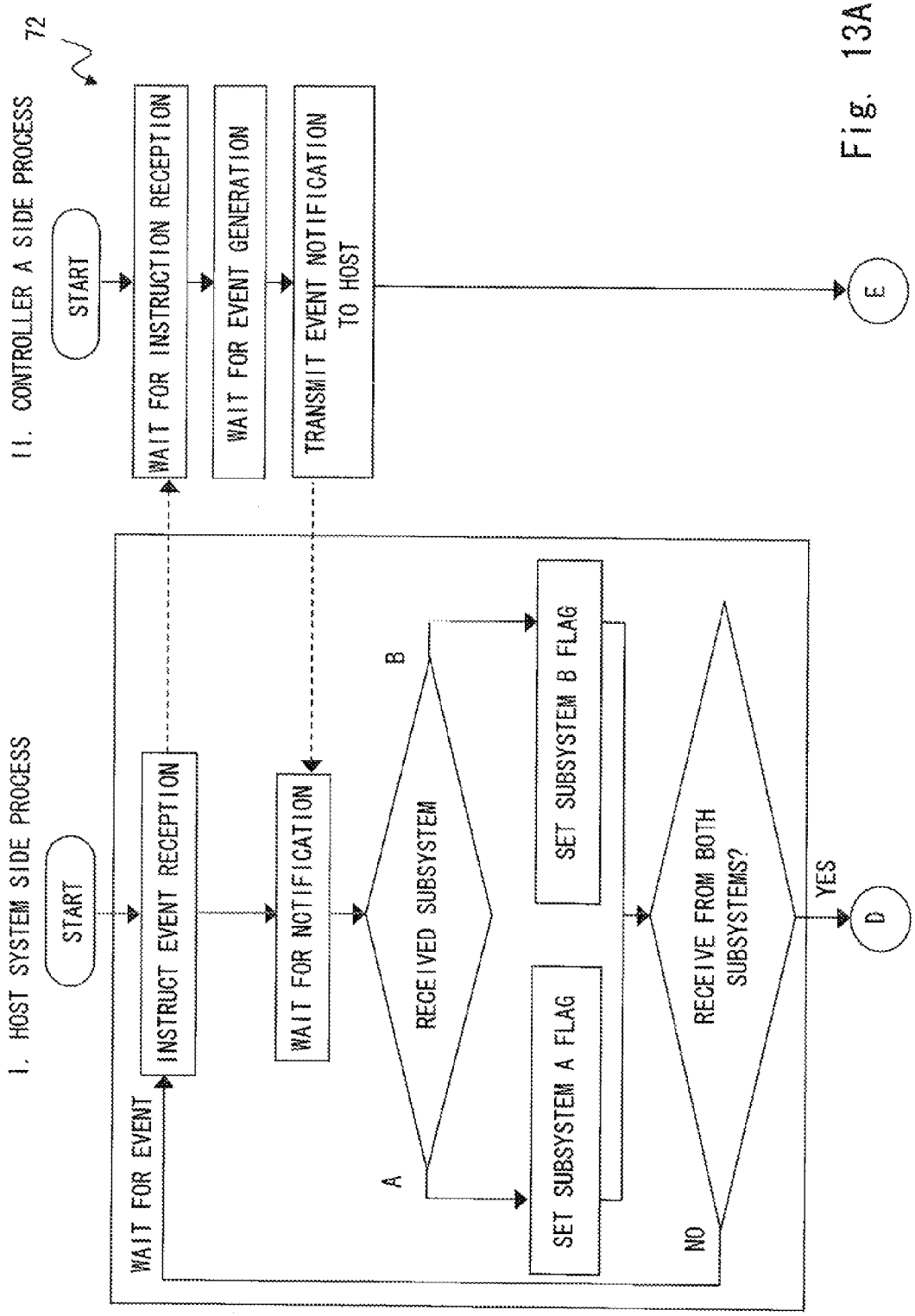
FIG. 13A is the combination code 72 in the second example of the configuration of controlled system 1 according to the first exemplary embodiment.
Figure 13B:
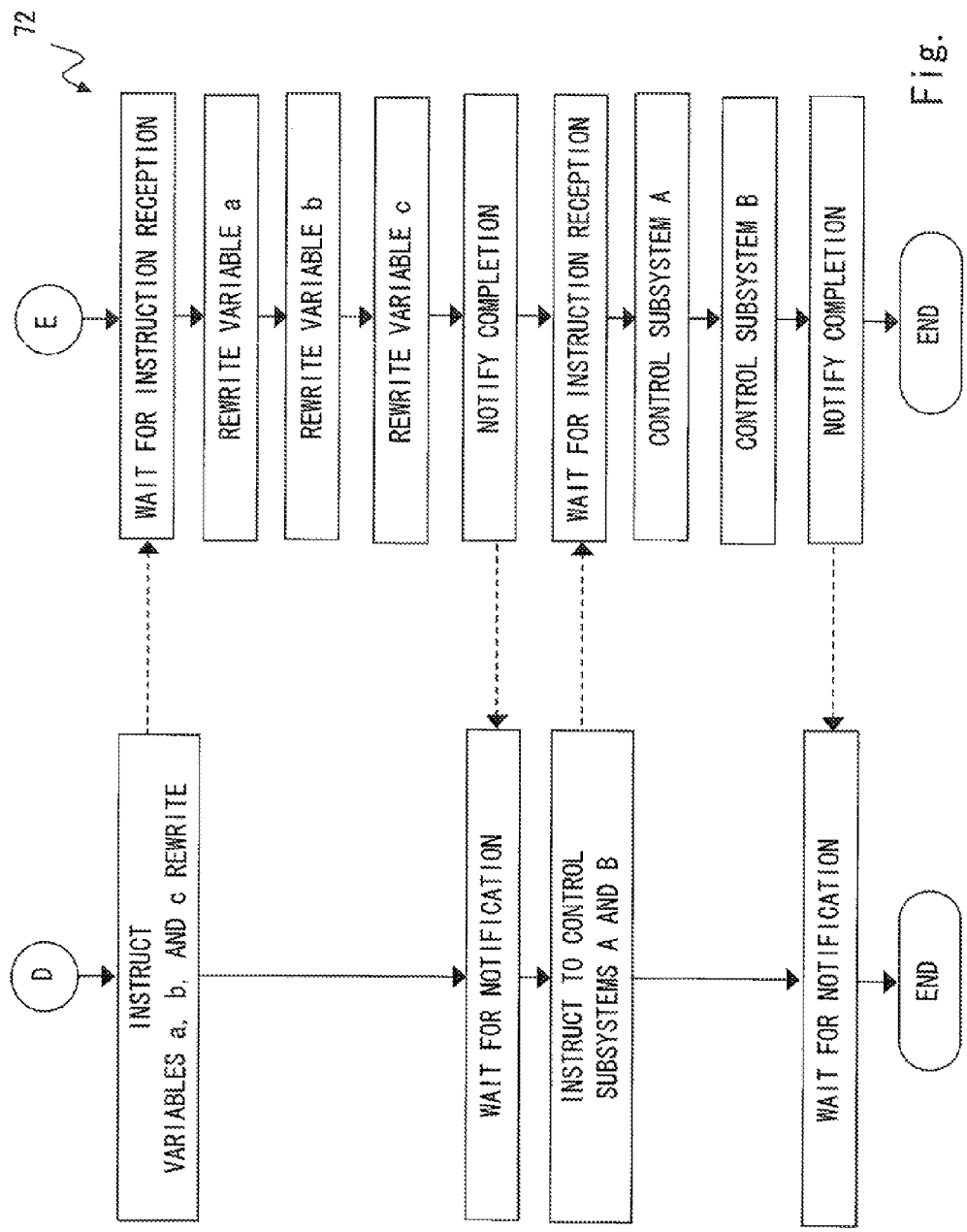
FIG. 13B is the combination code 72 in the second example of the configuration of controlled system 1 according to the first exemplary embodiment.

Next, the combination code constructing unit 222 performs reconstruction by expressing the system control command script description 81 of FIG. 5 with combination of the process in the host 3 and the process in the controller A41 using the system configuration information 82 and the attribute information 71, and outputs the combination code 72 as shown in FIG. 13. Note that although the combination code 72 is written in the form of the drawing, the combination code 72 is actually output in a form that is easy for computer processes. Hereinafter the combination code 72 shown in FIG. 13 is explained.

The process to wait for both of the core A and the core B to stop in the first line of the system control command script description 81 is reconstructed to a stop event waiting process by the controller A side, an event notification transmission process to the host, and a notification waiting process by the host side, since the first line of the attribute information 82 is an input from the controller A.

Next, a rewrite process of the variable a in the second line of the system control command script description 81 is reconstructed to a variable a rewrite instruction transmission process by the host side, an instruction reception waiting process, and a variable a rewrite process by the controller A side, since the attribute information 82 is an output to the subsystem A. The rewrite process of the variables b and c in the third and the fourth line of the system control command script description 81 is reconstructed in a similar manner. Here, since any variable is dealt via the controller A, the rewrite process of the variables a, b, and c is collectively processed.

The process in the fifth line of the system control command script description 81 is an output process to the subsystem A and the subsystem B. Here, an output target of the process from the second to the fourth line of the system control command script description 81 is a variable, however an output target of the process in the fifth line is the subsystem, that is, the purpose is to control the subsystem. Accordingly, the process to wait for the process up to the fourth line to complete once is added to the combination code 72. After waiting for the completion, the process in the fifth line of the system control command script description 81 is reconstructed to control instruction transmission to the controller by the host side, instruction reception wait by the controller side, and a subsystem control process.

After this, the code output unit 223 outputs FIG. 13I, which is the process by the host side, as the code for host 85, FIG. 13II, which is the process of the controller A for controlling the subsystem A and the subsystem B, as the code for controller A 83.

As a third example of the configuration of the controlled system 1, there is the controlled system 1 shown in FIG. 10. In the second example, although the controller A41 has a configuration that can perform only the simple processes, it is different in the third example in that as shown in the system configuration information 82 of FIG. 14, the controller A41 can perform advanced processes. The advanced processes do not simply perform the processes according to the instruction from the host, however they can independently perform a series of treatment including various condition judgment or the like inside the controller.

The attribute evaluation unit 221 outputs the attribute information 71 of FIG. 12 from the system control command script description 81 of FIG. 5 using the system configuration information 82 of FIG. 14. The processes so far are the same process as the second example.

Figure 15:
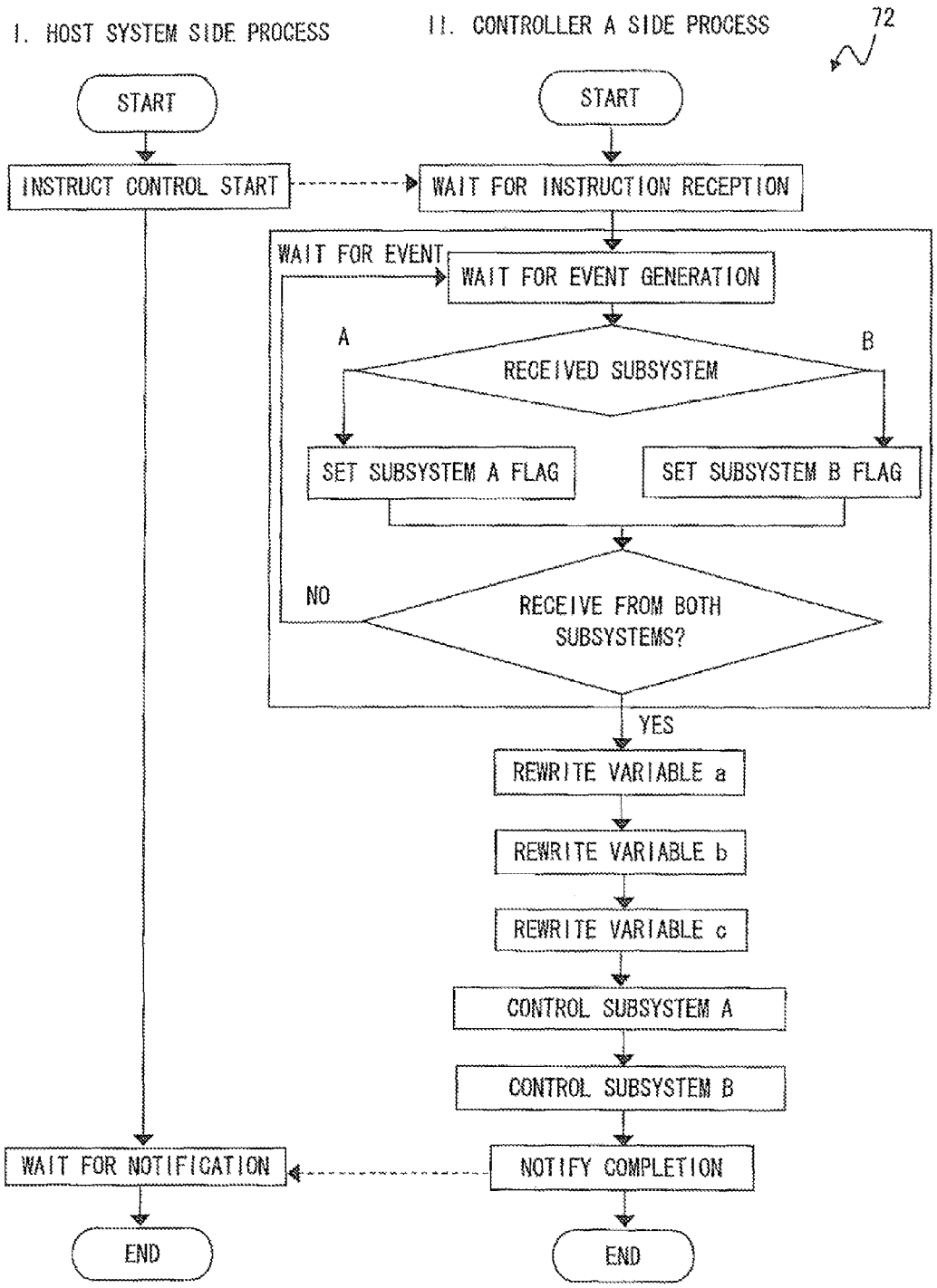
FIG. 15 is a combination code 72 in the third example of the configuration of the controlled system 1 according to the first exemplary embodiment.

Next, the combination code construction unit 222 performs reconstruction by expressing the system control command script description 81 of FIG. 5 with combination of the process in the host and the process in each subsystem as in FIG. 15 using the system configuration information 82 and the attribute information 71. In this configuration, since the controller A is capable of the advanced processes, the system control command script description 81 is dealt as the process for the controller A almost as it is. Only the cooperation process accompanied with the control start and the completion process with the host side is added to the process of the controller A side.

After this, the code output unit 223 outputs FIG. 15I, which is the process by the host side, as the code for host 85, FIG. 15II, which is the process of the controller A for controlling the subsystem A and the subsystem B, as the code for controller A 83.

Figure 16:
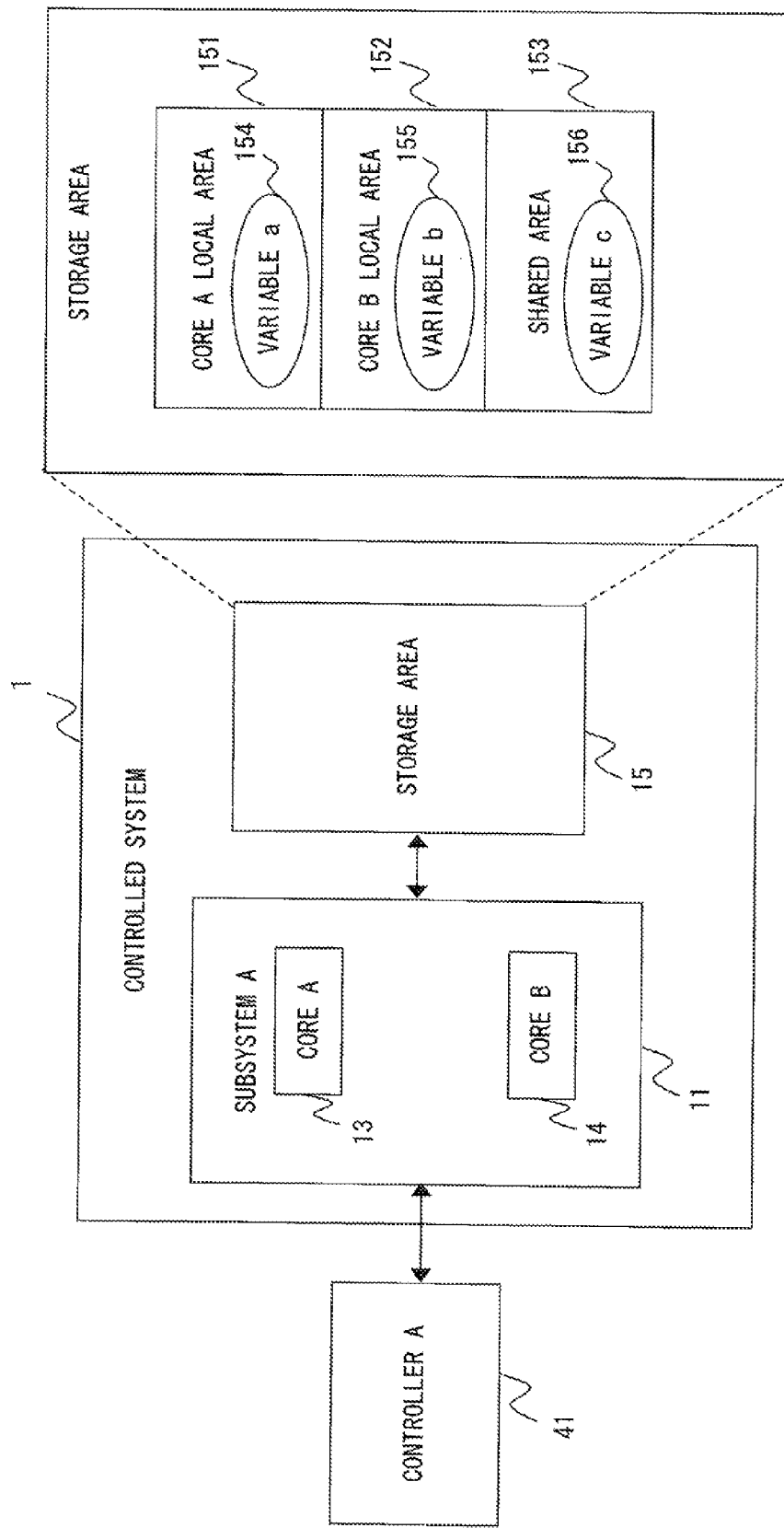
FIG. 16 a configuration example of the controlled system 1 according to the first exemplary embodiment.

As an example of the configuration of the other controlled system 1, there is the one shown in FIG. 16. The controlled system 1 of FIG. 16 differs from FIG. 10 in the point that the subsystem A11 includes the core A13 and the core B14.

In the controlled system 1 of this configuration, when the controller A corresponds only to the simple processes, the system configuration information 82 will be the one shown in FIG. 17. On the other hand, when the controller A corresponds to the advanced processes, the system configuration information 82 will be the one shown in FIG. 18. Also in this configuration, when the system configuration information 82 is the one shown in FIG. 17, the combination code construction unit 222 outputs the combination code 72 in the similar procedure as FIG. 13. When the system configuration information 82 is the one shown in FIG. 18, the combination code construction unit 222 outputs the combination code 72 in the similar procedure as FIG. 15. However, it is respectively reconstructed to deal the subsystem A instead of the subsystem B.

Next, an exemplary advantage of the system control command script processing device 2 in the first exemplary embodiment is explained. In general, the process that can deal by a single controller and the process that requires to deal including the host are different from each other as the control system configuration and the function of the controller are different between the controlled systems. Therefore, generally a unique system control command script must be prepared for individual system.

However, in this system, by the abovementioned series of processes, the system control command script for controlling the controlled system is separated into a code for host indicating the process in the host that performs the basic process of the control system, and a code for controller indicating the process in the controller. The controlled system can be controlled by the code for host and the code for controller. Accordingly, by using the same system control command script description 81, it is possible to make the controlled system 1 perform the same process regardless of the configuration of the control system and the function of the controller. Therefore, even when the subsystem configuration of the controlled system 1 and the controller change, the system control command script can be easily used.

Further, in the method to create the system control command process system dedicated for each configuration of the controlled system 1, the method to enable utilization of the integrated system control command script 81 is not realistic from the point of the building cost of the process system. On the other hand, in this system, by using the system configuration information 82, it is possible to correspond by one processing system regardless of the configuration of the controlled system.

Second Exemplary Embodiment

A second exemplary embodiment of the present invention is that a system control command script processing device 2 includes a code converter for each controller.

In the abovementioned system disclosed in PTL 1, the controller that can utilize the command script is included with a precondition that each controlled system includes a common protocol beforehand. Therefore, in the case in which the controlled system cannot include the protocol data for absorbing the difference between models that are similar to the controlled system, it is not possible to integrate and deal the controller and the controlled system which adopts different command scripts. This exemplary embodiment is related to a script description separation reconstructing device that can solve such problem.

Figure 19:
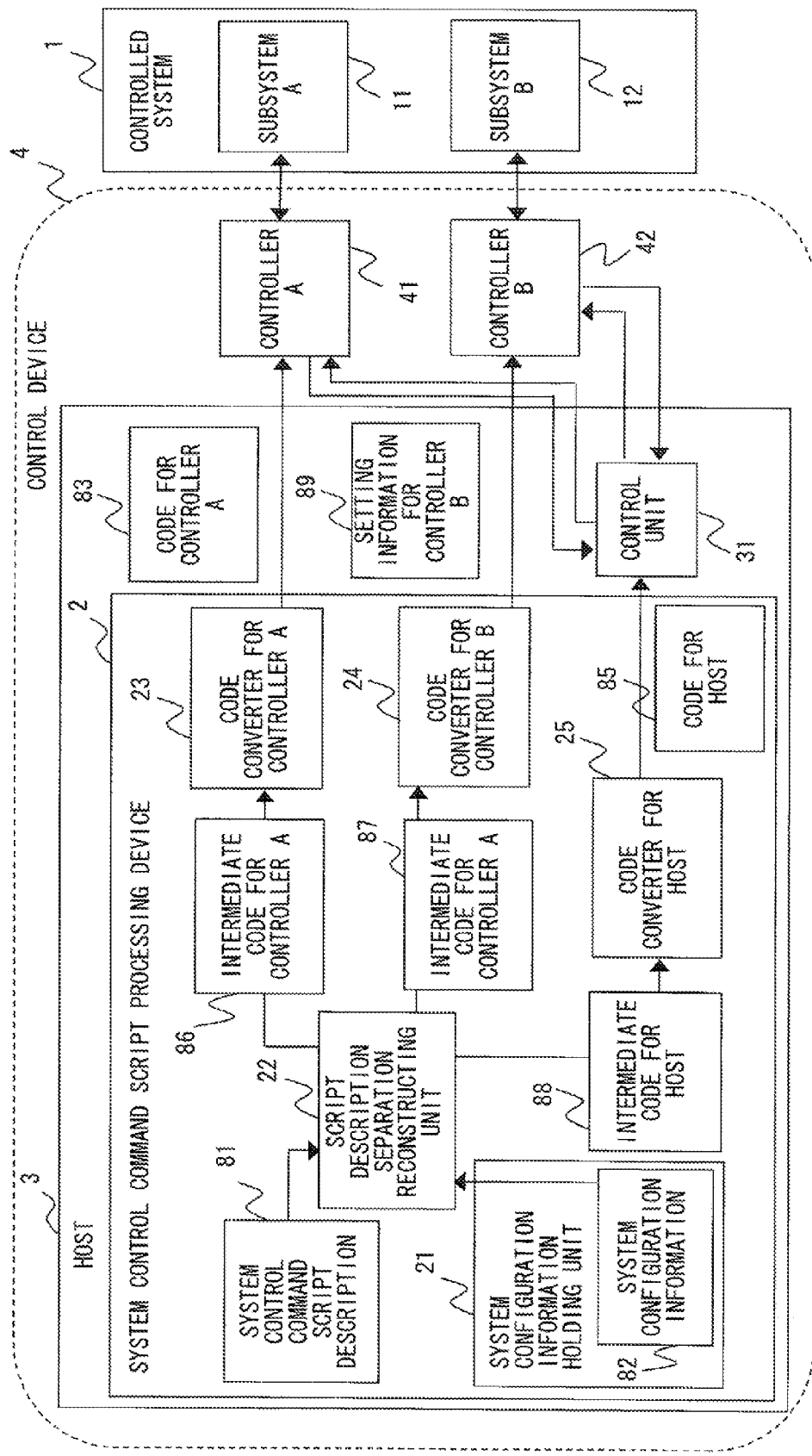
FIG. 19 is a block diagram showing a configuration according to a second exemplary embodiment.

An entire configuration of the control system according to this exemplary embodiment is shown in FIG. 19. Unlike the first exemplary embodiment, the system control command script processing device 2 according this to exemplary embodiment further includes a code converter for controller A 23, a code converter for controller B 24, and a code converter for host 25. A controller capable of advanced processes shall be used for the controller A41 in FIG. 18, and a controller capable of only simple processes shall be used for the controller B42.

The code converter converts the code output by the script description separation reconstructing unit 22 into a code format adopted by each controller or the control unit, and outputs it. In general, the code format that describes the control procedure adopted by the controller and the control unit is often unique to the controller or the control unit. Therefore, the code converter is added for each code format adopted by each controller and the control unit. Since the output code of the code output unit 223 inside the script description separation reconstructing unit 22 is used by the control unit 31 or the controller A41 and the controller B42 after it is converted by the code converter, it is dealt as an intermediate code.

Here, there are controllers of a type that specifies the operation by a value of a register, such as the controllers that are capable of only simple processes, instead of specifying the control procedure by the command script, depending on the configuration of the controller. Therefore, such type of code converter for controller converts the intermediate code into a register specified value of the controller. However, since the instructions during control are often provided from the control unit 31 on the host, the register specified value is mainly used as the register initial setting of the controller or the like.

It is not necessary to add the code converter to all the hosts and controllers. A configuration is possible in which instead of placing the output code of the script description separation reconstructing unit 22 to the section where it can be used as it is, it is added only to the section which requires the conversion of the code.

Figure 20:
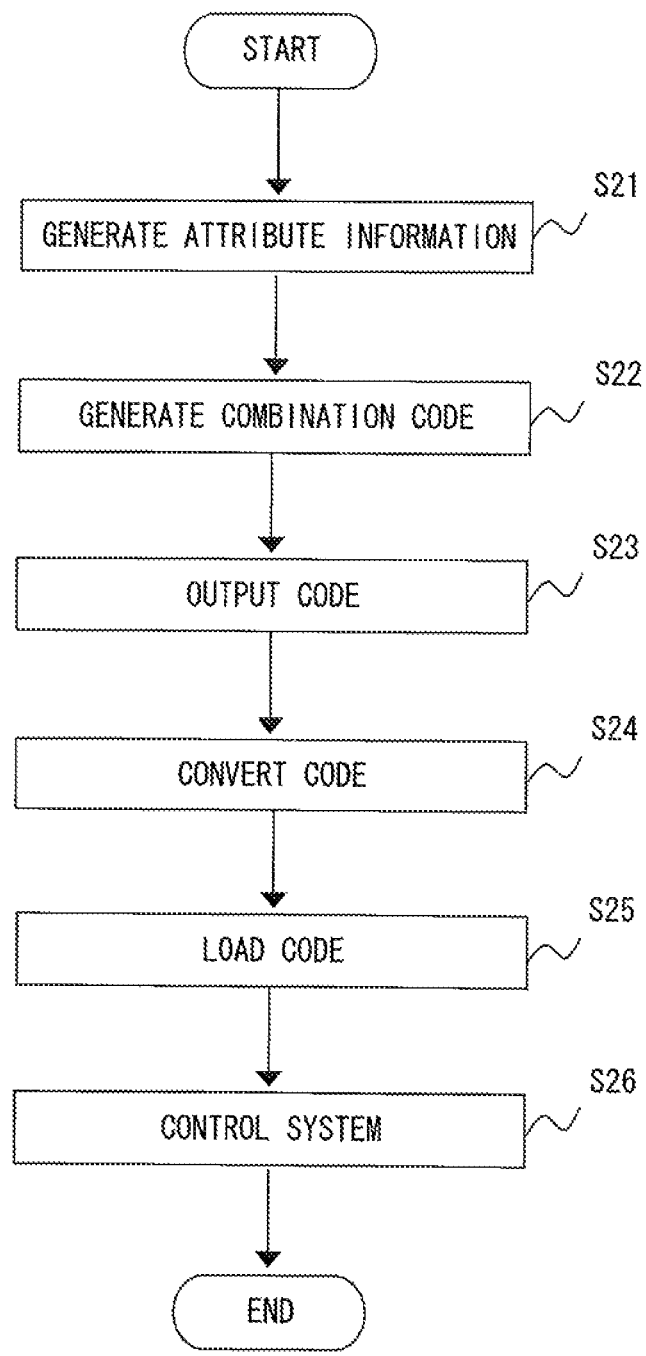
FIG. 20 is a flowchart showing a process flow of a control device according to the second exemplary embodiment.

Next, an operation of the system in this exemplary embodiment is explained using the flowchart of FIG. 20.

The attribute evaluation unit 221 outputs each descriptive content of the system control command script description 81 as the attribute information 71 using the system configuration information 82 (S21). Next, the combination code construction unit 222 performs reconstruction by expressing the system control command script description 81 with combination of the process in each controller and the process in the host using the attribute information 71. The combination code construction unit 222 outputs this as the combination code 72 (S22).

Next, among the combination code 72, the code output unit 223 outputs the process by the controller A41 and the controller B42 side respectively as an intermediate code for controller A 86 and an intermediate code for controller B 87, and outputs the process by the host 3 side (control unit 31) as an intermediate code for host 88 (S23). Since the output codes here are used by the controller A41, the controller B42, or the control unit 31 after they are converted by the subsequent code converter, they are dealt as the intermediate codes.

Lastly, the code converter for controller A 23 converts the intermediate code for controller A 86 into a code format adopted by the controller A41, and outputs the code for controller A 83. The code converter for controller B 24 converts the intermediate code for controller B 87 into the code format adopted by the controller B41, and outputs the setting information for controller B 89. Similarly, the code converter for host 25 converts the intermediate code for host 88 into the code format adopted by the control unit 31, and outputs the code for host 85 (S24).

After this, the system is actually operated (S25 and S26). At the time of operating the system, firstly the code for controller A 83 and the setting information for controller B 89 are loaded respectively on the controller A41 and the controller B42 which compose the control device 4 before operation. Further, the code for host 83 is loaded on the control unit 31 inside the host 3 (S25). After that, at the stage of operating the system, the controller A41 and the controller B42 cooperates and operates with the instruction from the control unit 31 (S26).

Next, an exemplary advantage of the system control command script processing system in the second exemplary embodiment of the present invention is explained.

The system control command script processing device 2 of this exemplary embodiment can integrate and deal even the controller or the controlled system 1 adopting different command scripts such as the case in which the controlled system 1 cannot include the protocol data for absorbing the difference between models that are similar to the controlled system 1. This is because that the code converter is included which converts the code output by the script description separation reconstructing unit 22 into the code format adopted by each controller or the control unit 31, and outputs it.

Since correspondence to various code forms is made by the code converter, the script description separation reconstructing unit 22 should correspond only to the output of a single code format. Therefore, it becomes unnecessary to construct the script description separation reconstructing unit 22 corresponding various controllers which adopt different code formats.

Further, even when the controller adopting a new code format that has not existed before is incorporated into the system, the system control command script processing device 2 of this exemplary embodiment can correspond by adding only the code converter for controller newly incorporating the script description separation reconstructing unit 22 without modification into the system.

Specific Example

Next, the configuration and the operation for enforcing the present invention are explained using a specific example. The example described below applies the system control command script processing system of this exemplary embodiment to the environment where test debugging of a system is performed.

Figure 21:
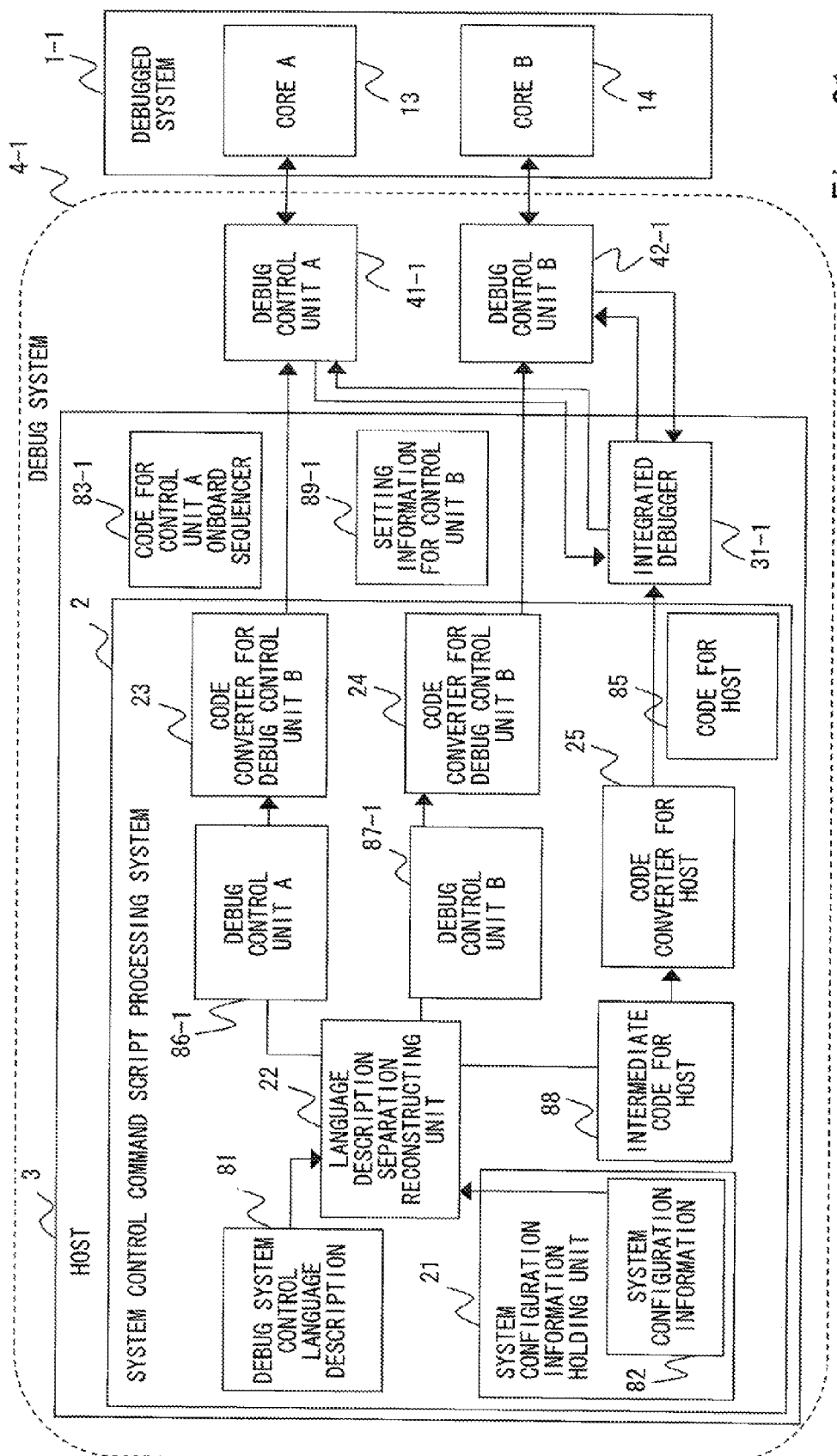
FIG. 21 is a block diagram showing a configuration of an example of the present invention.

FIG. 21 is a block diagram showing an entire configuration of the debug processing system in the example of this exemplary embodiment. A debug system 4-1 is a system for debugging a debugged system 1-1. The debug system 4-1 includes a host 3, which will be a base, and a system control command script processing device 2. The debugged system 1-1 further includes a core A 13 and a core B 14. A debug control unit A 41-1 and a debug control unit B 42-1 for controlling each core are included inside the debug system 4-1. The system control command script processing device 2 and an integrated debugger 31-1 of this example operate on the host 3.

The system control command script processing device 2 includes a system configuration information holding unit 21, a script description separation reconstructing unit 22, a code converter for debug control unit A 23-1, a code converter for debug control unit B 24-1, and a code converter for host 25. The subsystem of the debugged system 1-1 shall be respectively composed of one core, the notation is omitted, and only the core is shown. Further, in FIG. 21, a debug control unit capable of advanced processes shall be used for the debug control unit A 41-1. On the other hand, a debug control unit capable of only simple processes shall be used for the debug control unit B 42-1.

The system configuration information holding unit 21 holds the system configuration information 82 representing the configuration of the debugged system 1-1 and the debug system 4-1. The system configuration information 82 includes information concerning the configuration of the debugged system 1-1, information indicating the configuration of the entire debug system (a debugging tool operating on a computer, a hardware debugger such as JTAG-ICE targeted for CPU (Central Processing Unit), DSP (Digital Signal Processor) or the like, and a set of debug control unit such as a circuit for debugging and software for debugging etc. on the debugged system), and which of the debug control unit a controlled object such as the core and a source of the information (observational data or the like) notified from the debugged system information belong thereto.

The script description separation reconstructing unit 22 performs reconstruction by the form of separating the system control command script description 81 into a process in each debug control unit and a process in the host 3 side using the system configuration information 82 held by the system configuration information holding unit 21. The script description separation reconstructing unit 22 outputs the intermediate code for each debug control unit (an intermediate code for debug control unit A 86-1 and an intermediate code for debug control unit B 87-1) and an intermediate code for host 88-1 in FIG. 21.

The control procedure of the debugged system 1-1 is described in integrated debug system control language 81-1 regardless of the configuration of the debugged system 1-1 and the debug system 4-1. The debug system control language description 81-1 includes an output description for operating the system and an input description used for the evaluation condition that executes the output description. The output description includes description etc. which stops the operation of the debugged system 1-1, performs execution control such as resuming execution, controls the debug system 4-1, or changes values of registers and variables. The input description includes, for example, a description which obtains the state of the debugged system 1-1 and the debug system 4-1, and a description which obtains event information indicating that a particular operation in the debugged system 1-1 is detected. Further, beside the output description and the input description, a description of the condition judgment or the like is included as necessary.

The code converter (the code converter for debug control unit A 23-1, the code converter for debug control unit B 24-1, and the code converter for host 25) converts the intermediate code output by the script description separation reconstructing unit 22 into the code format adopted by each debug control unit or the integrated debugger 31-1, and outputs it.

In general, the code format that describes the control procedure adopted by the debug control unit and the integrated debugger is often unique to the debug control unit or the integrated debugger. Therefore, the code converter is added to each code format adopted by the debug control unit or the integrated debugger. There are debug control units of a type that specifies the operation by the value of the register such as the debug control unit capable of only simple processes, instead of specifying the control procedure by the command script depending on the configuration of the debug control unit. Therefore, such type of the code converter for debug control unit converts the intermediate code into a register specified value of the debug control unit. However, since the instructions during control are often provided from the integrated debugger 31-1 on the host, the register specified value here is mainly used for register initialization setting of the debug control unit or the like. Moreover, it is not necessary to add the code converter to all the debug control units and hosts. A configuration is possible in which instead of placing the output code of the script description separation reconstructing unit 22 to the section where it can be used as it is, it is added only to the section which requires the conversion of the code.

The integrated debugger 31-1 executes the code for host 85, which is an output code of the code converter for host 25, performs transmission and reception of a control instruction to the debug control unit 41-1 and the debug control unit 42-1, performs transmission and reception of an operation status, and controls the debugged system 1-1 by operating the entire debug system 4-1.

In this example, the debug control unit A 41-1 in the debug system 4-1 is capable of the advanced processes. Therefore, a code for control unit A onboard sequencer 83-1 is output from the code converter for debug control unit A 23-1. The debug control unit A 41-1 cooperates and operates with the instruction from the integrated debugger 31-1 in accordance with this code for control unit A onboard sequencer 83-1, and controls the core A13.

On the other hand, in this example, the debug control unit B42 is capable of only simple processes. Therefore, the code converter for debug control unit B 24-1 outputs only setting information for control unit B 89-1 used for initial configuration. The debug control unit B42-1 is initialized based on this setting information before control start, operates by the instruction from the integrated debugger 31-1 at the time of control, and controls the core B14.

Next, details of the script description separation reconstructing unit 22 are explained using FIG. 3. Note that the script separation reconstructing unit 22 of this example has a similar configuration as the first exemplary embodiment, thus it is explained using FIG. 3. The script description separation reconstructing unit 22 is composed of an attribute evaluation unit 221, a combination code construction unit 222, and a code output unit 223.

The attribute evaluation unit 221 outputs attribute information of each line of the debug system control language description 81-1 using the system configuration information 82 from the debug system control language description 81-1 as the attribute information 71. The attribute information 71 is composed of information of whether each line in the debug system control language description 81-1 is an input or an output, or what is the target of the input and the output (the core, the debug control unit, and the variable etc.) or the like.

The combination code construction unit 222 performs reconstruction by expressing the debug system control language description 81-1 with combination of the process in the host and the process in each debug control unit using the attribute information 71. The combination code construction unit 222 combines this, and outputs it as the combination code 72.

At the time of the reconstruction, the combination code construction unit 222 automatically categorizes the debug system control language description 81-1 into a local action in which the process closes inside the debug control unit or the integrated debugger 31-1, and a global action which requires the process over a plurality of the debug control units or the integrated debuggers 31-1. When a generator of the input used as the condition for executing the output description and a target of the output description is inside the same debug control unit or the integrated debugger 31-1, it is categorized as a local action.

Note that especially, for example, when the controller does not include a sequencer, even when the process as the local action is essentially desirable, the debug control unit which requires the process by the host 3 side exists. In this case, the combination code constructing unit 222 categorizes the corresponding section as the global action regardless of the range where an action closes. The section categorized as the local action is dealt as the process inside the debug control unit or the integrated debugger 31-1 as it is. The section categorized as the global action is reconstructed in the form of being separated into the process inside the debug control unit and the process in the host 3 side. Here, at the time of separating into the process inside the debug control unit and the process of the host 3, the combination code constructing unit 222 complements the communication process and synchronization process as necessary so that the whole may operate according to the procedure of the system control command script description 81.

The code output unit 223 separates the combination code 72 into the process for each debug control unit and the host, and outputs it as the code 80. The code 80 is equivalent to the code for control unit A onboard sequencer 83-1, the setting information for control unit B 89-1, and the code for host 85 in FIG. 21. The code output to each debug control unit includes a description categorized as the local action of each debug control unit and a process inside the debug control unit reconstructed among the global actions.

Note that although the debugged system 1-1 is composed of two, which are the core A 14 and the core B14, the system control command script processing device 2 can be easily extended to a system corresponding to the debugged system 1-1 composed of any number of cores. Further, in FIG. 21, although it is described that the debug control unit for core A13 A41-1 and the debug control unit for core B14 B42-1 are composed separately from the host 3, it is not limited to this. For example, there can be methods such as a configuration of including the debug control unit A41-1 and the debug control unit B42-1 inside the host 3 as software for host 3 and composing them as a part inside the debugged system 1-1.

Figure 22:
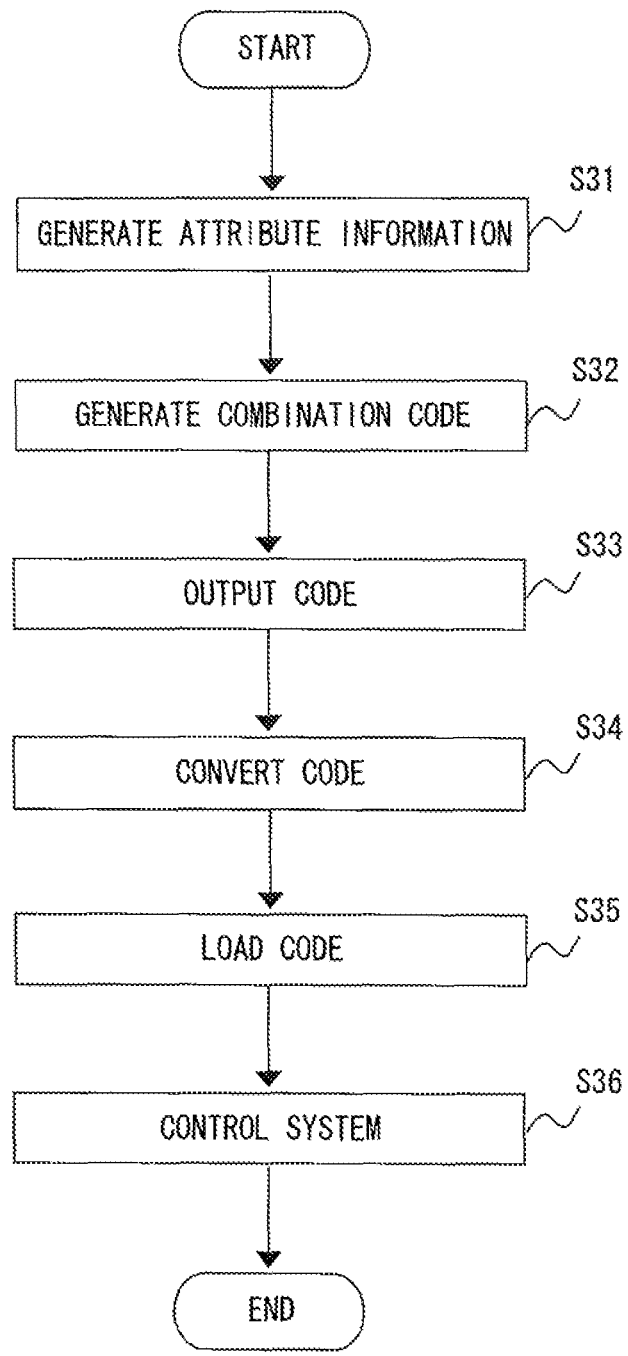
FIG. 22 is a flowchart showing a process flow of a control device in the example of the present invention.

Next, an operation of the system control command script processing system in this example is explained using the flowchart of FIG. 22.

The attribute evaluation unit 221 outputs the attribute information 71 of each descriptive content of the debug system control language description 81-1 using the system configuration information 82 (S31). The combination code construction unit 222 performs reconstruction by expressing the debug system control language description 81-1 with combination of the process in each debug control unit and the process in the host 3 using the attribute information 71. The combination code construction unit 222 combines this, and outputs it as the combination code 72 (S32).

Among the combination code 72, the code output unit 223 outputs the process by the debug control unit A41-1 side as the intermediate code for debug control unit A 86-1. Further, the process by the debug control unit B42-1 side is output as the intermediate code for debug control unit B 87-1. Similarly, the code output unit 223 outputs the process by the host 3 side (the integrated debugger 31-1) as the intermediate code for host 88 (S33). Since this output code is used in the debug control unit A41-1, the debug control unit B42-1, and the integrated debugger 31-1 after being converted by the subsequent code converter, it is dealt as an intermediate code.

Lastly, the code converter for debug control unit A 23-1 converts the intermediate code for debug control unit A 86-1 into the code format adopted by the debug control unit A41-1, and outputs the code for debug control unit A onboard sequencer 83-1. The code converter for debug control unit B 24-1 converts the intermediate code for debug control unit B 87-1 into the code format adopted by the debug control unit B42-1, and outputs the setting information for debug control unit B 89-1. Similarly, the code converter for host 25 performs conversion into the code format adopted by the integrated debugger 31-1, and outputs the code for host 85 (S34).

After this, the system is actually operated (S35 and S36). When operating the system, the code for debug control unit A onboard sequencer 83-1 and the setting information for debug control unit B 89-1 is respectively loaded on the debug control unit A41-1 and the debug control unit B42-1 that compose the debug system 4-1, and the code for host 83 is loaded on the integrated debugger 31-1 inside the host 3 (S35). After that, at the stage of operating the system, the debug control unit A41-1 and the debug control unit B42-1 cooperate and operate with the instruction from the integrated debugger 31-1 (S36).

Figure 23:
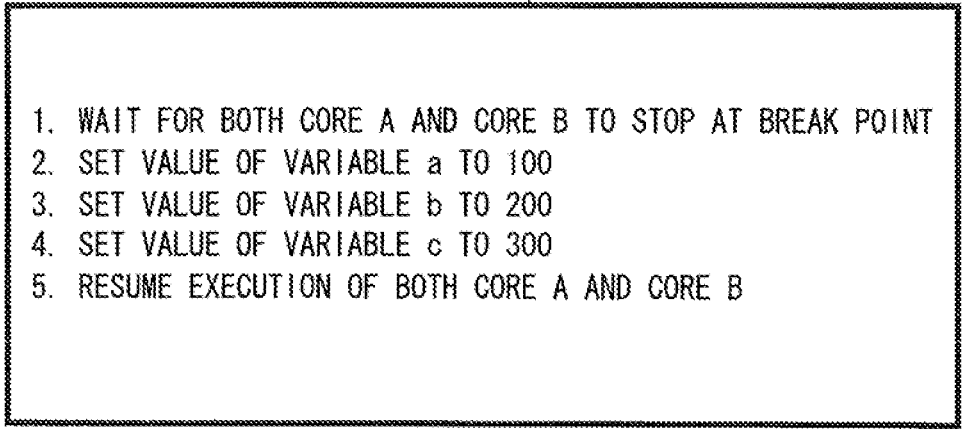
FIG. 23 is a description example of a debugging environment control language description 81-1 in the example of the present invention.

Next, an example of the reconstruction of the debugging environment control language description is shown in FIG. 23. FIG. 23 shows the process of changing the values of the variables a, b and c, and resuming the execution of both the core A and the core B after both of the core A and the core B stop at a break point. Note that in FIG. 23, although the process is written in natural language for explanation, it is actually written in a script format.

Figure 24:
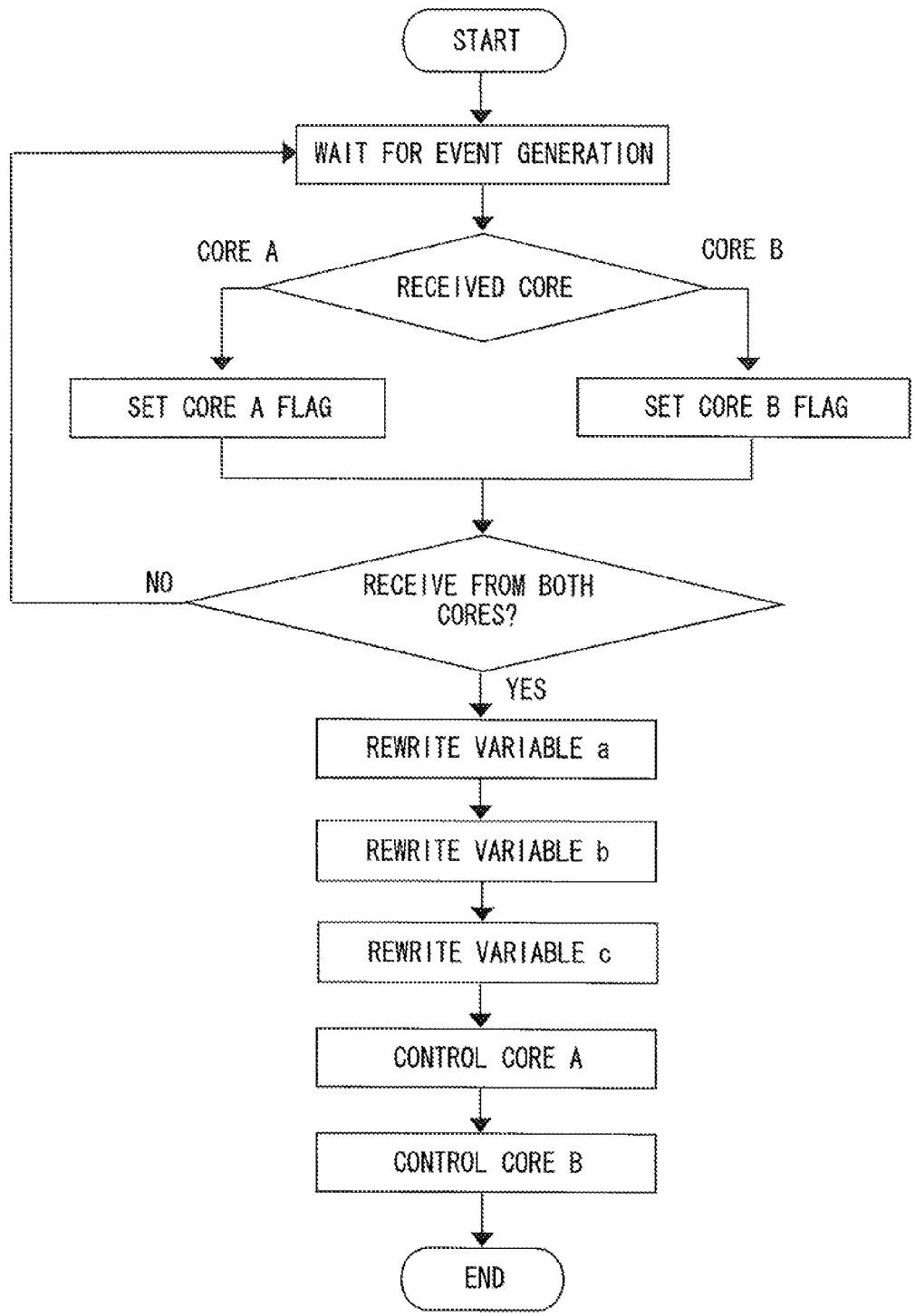
FIG. 24 is an output example of the combination code 72 in the example of the present invention.

In the system which controls the two cores by one debug control unit (debugger etc.), all of this description will be a local action, and the description is not reconstructed. Accordingly, the instruction to perform the control of FIG. 24 is performed to the debug control unit.

Figure 25:
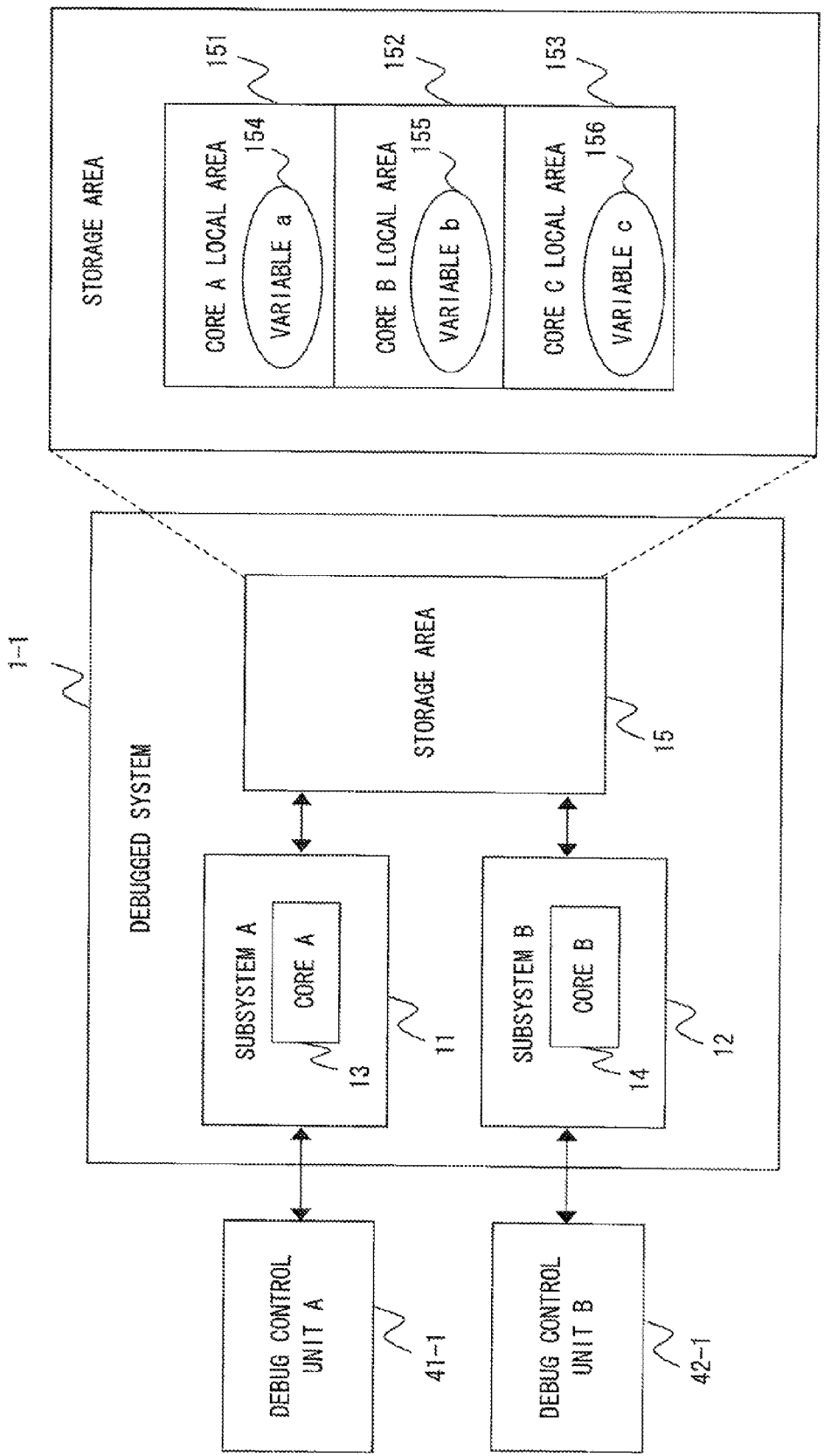
FIG. 25 is a configuration example of a debugged system in the example of the present invention.

On the other hand, the system using two debug control units requires reconstruction of the debugging environment control language description. Here, the system shown in FIG. 25 is composed of the debug control unit A41-1 for controlling the core A13 and the debug control unit B42-1 for controlling the core B14, and further shows an operation when dealing the variable a154 in the core A local area, the variable b155 in the core B local area, and the variable c156 in the shared area.

Figure 26:
FIG. 26 is an example of the system configuration information 82 in the example of the present invention.
Figure 27:
FIG. 27 is an example of attribute information 71 in the example of the present invention.

The attribute evaluation unit 221 outputs the attribute information 71 of FIG. 27 using the system configuration information 82 of FIG. 26 from the debugging environment control language description 81-1 of FIG. 23. The attribute information 71 is composed of information indicating which debug control unit each piece of them is targeted for, whether it is an input or output, and what is the target of the input and output (the core, the debug control unit, the variable or the like).

Figure 28A:
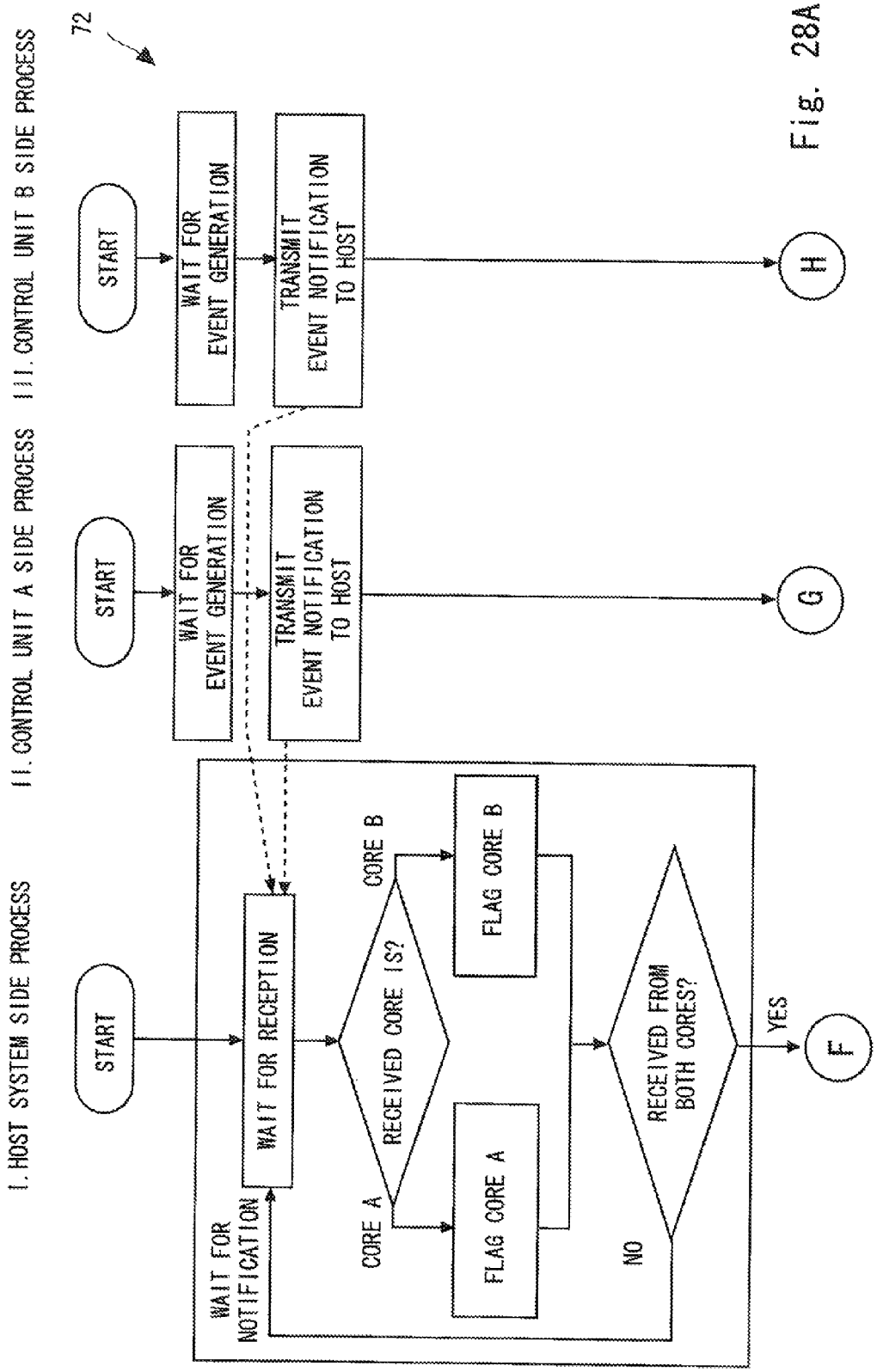
FIG. 28A is an example of the combination code 72 in the example of the present invention.
Figure 28B:
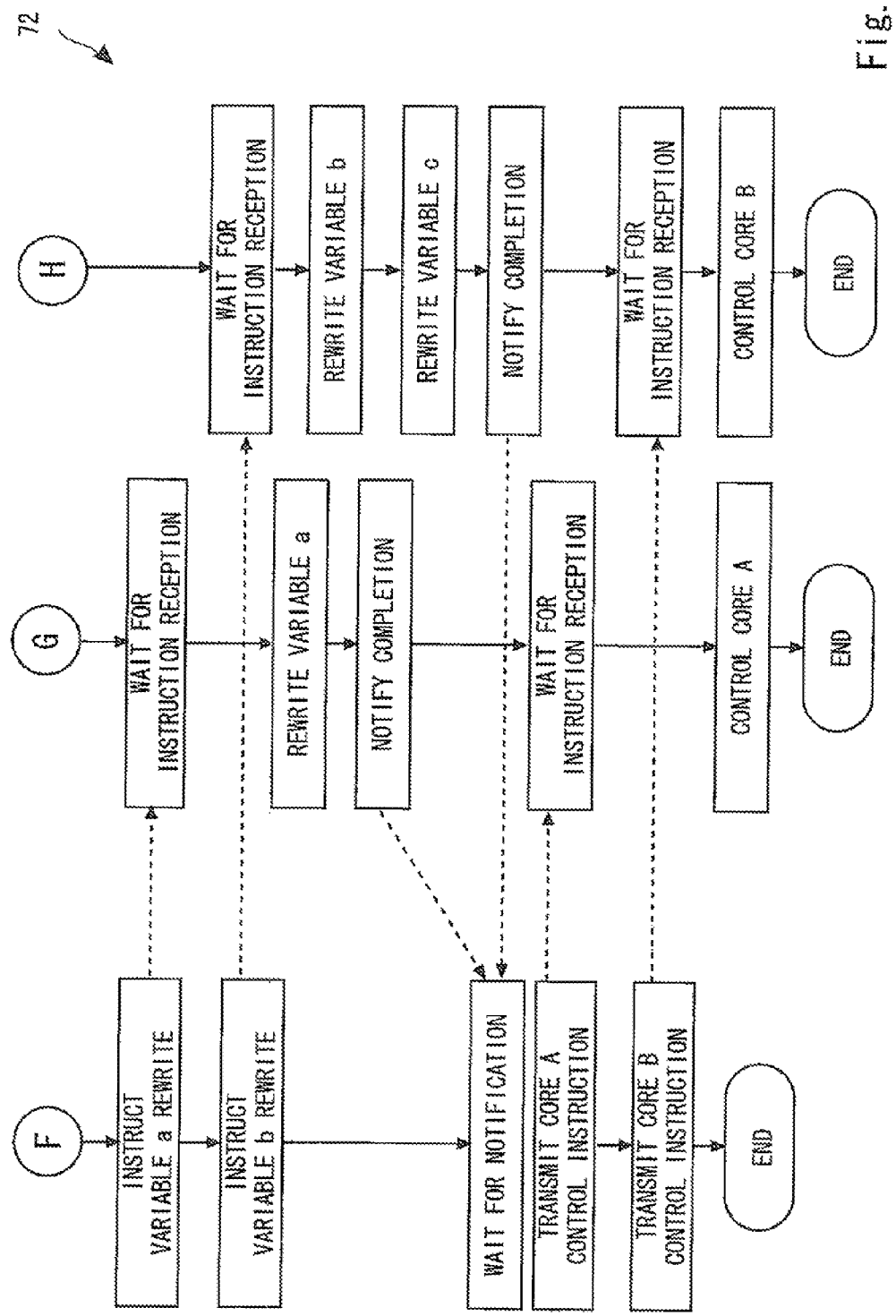
FIG. 28B is an example of the combination code 72 in the example of the present invention.
Figure 29:
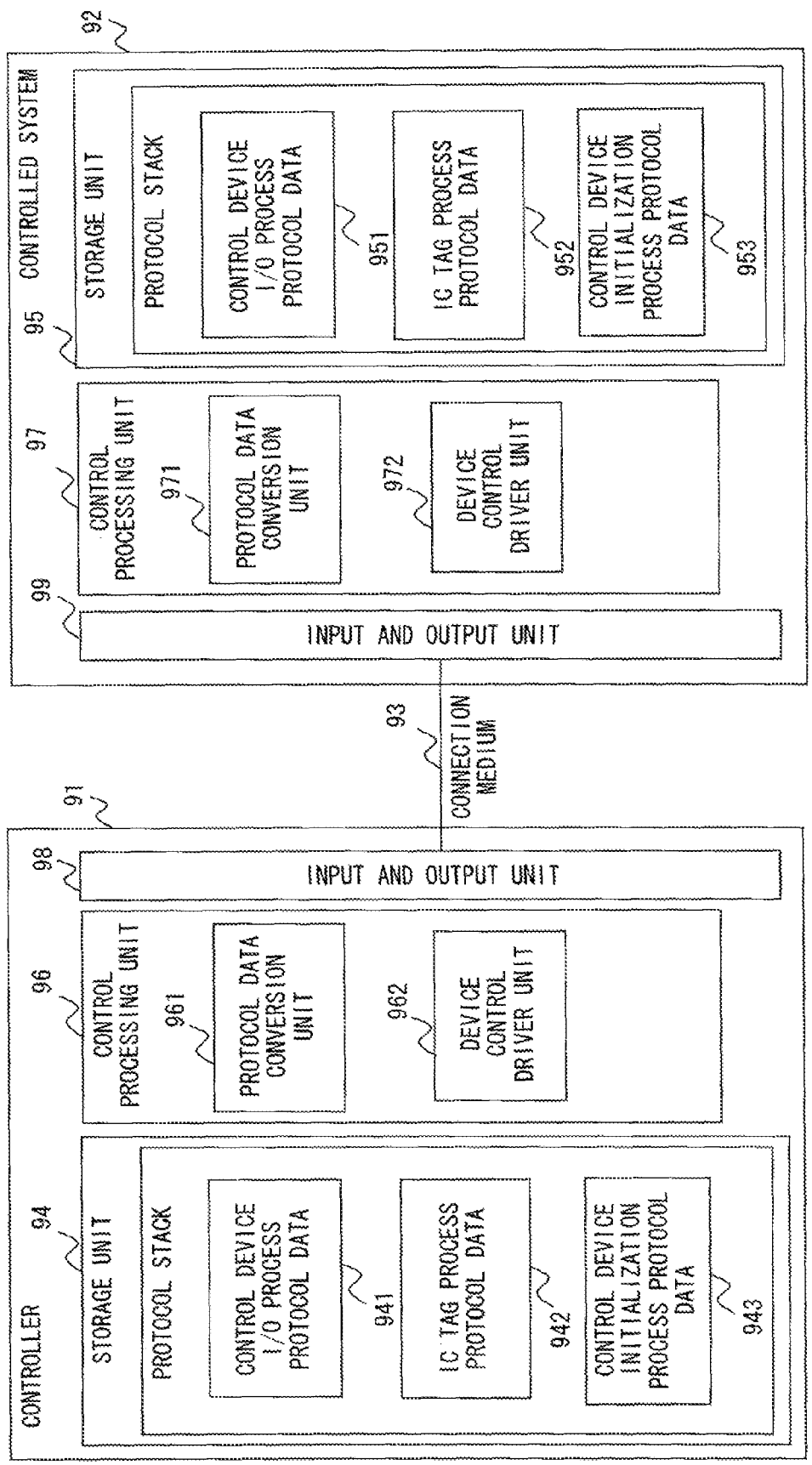
FIG. 29 is a block diagram showing a configuration of a controller disclosed in PTL 1.

Next, the combination code constructing unit 222 reconstructs the debug system control language description of FIG. 23 as in FIG. 28 using the attribute information 71, and outputs it as the combination code 72. The process to wait for both of the core A and the core B to stop at a break point in the first line of the debug system control language description 81-1 of FIG. 23 is reconstructed to break point stop event wait of the core A and the core B by the debug control unit A and the debug control unit B side, an event notification transmission process to the host, and a notification waiting process by the host side, since the attribute information 71 is an input from both of the debug control unit A and the debug control unit B.

A rewrite process of the variable a of the second line of the debug system control language description 81-1 of FIG. 23 is reconstructed to variable a rewrite instruction transmission by the host side, an instruction reception waiting process by the debug control unit A side, and a variable a rewrite process, since the attribute information is an output to the debug control unit A. The process in the third and the fourth line of the debug system control language description 81-1 of FIG. 23 is reconstructed in a similar manner. Since the process in the fourth line of the debug system control language description 81-1 of FIG. 23 can be processed by the both of the debug control unit A and the debug control unit B, an improvement in the efficiency is expected by dealing in series with the process in the third line.

The process in the fifth line of the debug system control language description 81-1 of FIG. 23 is an output process to the debug control unit A and the debug control unit B. Here, although an output target of the process in the second to the fourth line of the debug system control language description 81-1 of FIG. 23 is a variable, the process in the fifth line is a core, thus the process to wait for the process up to the fourth line to complete once is added. After waiting for the completion, the process in the fifth line is reconstructed to control instruction transmission to the debug control unit A and the debug control unit B by the host side, instruction reception wait by the debug control unit side, and a core control process.

Next, among the combination code 72, the code output unit 223 outputs FIG. 28II, which is the process in the debug control unit A41-1, as an intermediate code for debug control unit A 86-1. Moreover, the code output unit 223 outputs FIG. 28III, which is the process by the debug control unit B42-1 side, as an intermediate code for debug control B 87-1. Similarly, the code output unit 223 outputs FIG. 28I, which is the process by the host side, and outputs it as the intermediate code for host 88.

Lastly, the code converter for debug control unit A 23-1 converts the intermediate code for debug control unit A 86 into the code format adopted by the debug control unit A41-1, and outputs the code for debug control unit A onboard sequencer 83-1. The code converter for debug control unit B 24-1 converts the intermediate code for debug control unit B 87 into the code format adopted by the debug control unit B42-1, and outputs the setting information for debug control unit B 89-1. Similarly, the code converter for host 25 performs conversion into the code format adopted by the integrated debugger 31-1, and outputs the code for host 85.

Next, an exemplary advantage of the system control command script processing system in this example is explained.

In general, the process that can deal by a single debug control unit and the process that requires to deal including the host are different from each other as the debug system configuration is different between the debugged systems. Therefore, generally a control script of the debug system must be prepared for each individual system.

However, in this system, the entire debug system operates according to the operation described in the control language. By the abovementioned series of processes, the debug system control language description for controlling the debugged system into the code for host indicating the process in the host and the code indicating the process in the debug control unit. The debugged system can be controlled by the code for host and the code for debug control unit. Accordingly, by using the same control description, it is possible for the debug system to perform the same process regardless of the configuration of the debugged system and the debug system. Therefore, even when the system changes, the same control description is easily utilized.

Further, in the method to create the control language process dedicated for each configuration of the debug system, the method to enable utilization of the integrated debug system control language is not realistic from the point of the building cost. On the other hand, in this system, by using the system configuration information, it is possible to correspond with one process system regardless of the configuration of the debugged system and the debug system.

Note that the present invention is not limited to the above exemplary embodiments but may be modified as appropriate without departing from the scope.

The present application claims priority rights of and is based on Japanese Patent Application No. 2009-124159 filed on May 22, 2009 in the Japanese Patent Office, the entire contents of which are hereby incorporated by reference.

INDUSTRIAL APPLICABILITY

The present invention includes availability to the environment where test debugging of arbitrary systems is performed, for example.

REFERENCE SIGNS LIST

1 CONTROLLED SYSTEM
1-1 DEBUGGED SYSTEM
11 SUBSYSTEM A
12 SUBSYSTEM B
13 CORE A
14 CORE B

2 SYSTEM CONTROL COMMAND SCRIPT PROCESSING DEVICE
21 SYSTEM CONFIGURATION INFORMATION HOLDING UNIT
22 SCRIPT DESCRIPTION SEPARATION RECONSTRUCTING UNIT
221 ATTRIBUTE EVALUATION UNIT
222 COMBINATION CODE CONSTRUCTING UNIT
223 CODE OUTPUT UNIT
23 CODE CONVERTER FOR CONTROLLER A
23-1 CODE CONVERTER FOR DEBUG CONTROL UNIT A
24 CODE CONVERTER FOR CONTROLLER B
24-1 CODE CONVERTER FOR DEBUG CONTROL UNIT B
25 CODE CONVERTER FOR HOST
3 HOST
31 CONTROL UNIT
31-1 INTEGRATED DEBUGGER
4 CONTROL DEVICE
4-1 DEBUG SYSTEM
41 CONTROLLER A
41-1 DEBUG CONTROL UNIT A
42 CONTROLLER B
42-1 DEBUG CONTROL UNIT B
71 ATTRIBUTE INFORMATION
72 COMBINATION CODE
80 CODE
81 SYSTEM CONTROL COMMAND SCRIPT DESCRIPTION
82 SYSTEM CONFIGURATION INFORMATION
82-1 DEBUG SYSTEM CONFIGURATION INFORMATION
83 CODE FOR CONTROLLER A
83-1 CODE FOR DEBUG CONTROL UNIT A
84 CODE FOR CONTROLLER B
85 CODE FOR HOST
86 INTERMEDIATE CODE FOR CONTROLLER A
86-1 INTERMEDIATE CODE FOR DEBUG CONTROL UNIT A
87 INTERMEDIATE CODE FOR CONTROLLER B
87-1 INTERMEDIATE CODE FOR DEBUG CONTROL UNIT B
88 INTERMEDIATE CODE FOR HOST
89 SETTING INFORMATION FOR CONTROLLER B
89-1 SETTING INFORMATION FOR DEBUG CONTROL UNIT B
91 CONTROLLER
92 CONTROLLED SYSTEM
93 CONNECTION MEDIUM
94 and 95 STORAGE UNIT
96 and 97 CONTROL PROCESSING UNIT
98 and 99 INPUT AND OUTPUT UNIT
941 and 951 CONTROL DEVICE I/O PROCESS PROTOCOL DATA
942 and 952 IC TAG PROCESS PROTOCOL DATA
943 and 953 CONTROL DEVICE INITIALIZATION PROCESS PROTOCOL DATA
961 and 971 PROTOCOL DATA EXCHANGE UNIT
962 and 972 DEVICE CONTROL DRIVER UNIT

The invention claimed is:

1. A script description separation reconstructing device comprising a processor and a script description separation reconstructing unit implemented at least using the processor, the script description separating reconstructing unit refers to system configuration information of a controlled system composed of at least a plurality of subsystems and a control device for controlling the controlled system, separates a system control command script description for controlling the controlled system into a code for host indicating a process in a host that performs a basic process in the control system and a code for a plurality of controllers indicating a process in the controllers that control the subsystems of the controlled system, and reconstructs the system control command script description;

wherein the script description separation reconstructing unit comprises:

an attribute evaluation unit that refers to the system configuration information, evaluates an attribute of each descriptive content of the system control command script description, and outputs attribute information thereof;

a combination code construction unit that generates a combination code expressed by a process inside the host and a process in each of the controllers using the attribute information, wherein the attribute evaluation unit outputs the attribute information including one or more of an attribute indicating information indicating execution information of the process, an attribute indicating whether or not it is an input process or an output process, and an attribute indicating a component of the controlled system which is a target of an input and an output, wherein the combination code construction unit separates the system control command script description into a local action in which the process closes inside each of the controllers or the host and a global action which requires the process over a plurality of controllers or the host based on the attribute information, and separates the global action into the process in each of the controllers and the process by the host side according to the procedure of the system control command script description.

2. The script description separation reconstructing device according to claim 1, wherein the script description separation reconstructing unit further comprises:
a code output unit that outputs the combination code as the code for host and the code for controller.

3. The script description separation reconstructing device according to claim 1, wherein the system configuration information includes information concerning a subsystem configuration of the controlled system, information concerning the controller, and information indicating the controller to which each component of the controlled system is connected.

4. The script description separation reconstructing device according to claim 1, wherein the script description separation reconstructing unit further comprises at least one code conversion unit that outputs the code for host or the code for controller as an intermediate code, and converts the intermediate code into a code unique to each of the host or the controller.

5. The script description separation reconstructing device according to claim 4, wherein the code conversion unit converts the intermediate code into a register specified value of the subsystem.

6. A control device comprising a processor and a script description separation reconstructing unit implemented at least using the processor, the script description separation reconstructing unit refers to system configuration information of a controlled system composed of at least a plurality of subsystems and a control device for controlling the controlled system, separates a system control command script description for controlling the controlled system into a code for host indicating a process in a host that performs a basic process in the control system and a code for a plurality of controllers indicating a process in the controller that controls the subsystems of the controlled system, and reconstructs the system control command script description;

wherein the script description separation reconstructing unit comprises:

an attribute evaluation unit that refers to the system configuration information, evaluates an attribute of each descriptive content of the system control command script description, and outputs attribute information thereof;

a combination code construction unit that generates a combination code expressed by a process inside the host and a process in each of the controllers using the attribute information, wherein the attribute evaluation unit outputs the attribute information including one or more of an attribute indicating information indicating execution information of the process, an attribute indicating whether or not it is an input process or an output process, and an attribute indicating a component of the controlled system which is a target of an input and an output, wherein the combination code construction unit separates the system control command script description into a local action in which the process closes inside each of the controllers or the host and a global action which requires the process over a plurality of controllers or the host based on the attribute information, and separates the global action into the process in each of the controllers and the process by the host side according to the procedure of the system control command script description.

7. The control device according to claim 6, further comprising a system configuration information holding unit that holds the system configuration information.

8. The control device according to claim 6 further comprising a control unit that executes the code for host.

9. The control device according to claim 6, further comprising a controller that executes the code for controller.

10. A processing system comprising the control device according to claim 6 and at least one or more of the controlled systems.

11. A script description separation reconstructing method comprising:

referring to system configuration information of a controlled system composed of at least a plurality of subsystems and a control device for controlling the controlled system;

separating a system control command script description for controlling the controlled system into a code for host indicating a process in a host that performs a basic process in the control system and a code for a plurality of controllers indicating a process in the controller that controls the subsystems of the controlled system, and reconstructing the system control command script description;

referring to the system configuration information, evaluating an attribute of each descriptive content of the system control command script description, and outputting attribute information thereof; and generating a combination code expressed by a process inside the host and a process in each of the controllers using the attribute information, wherein the attribute information that is output includes one or more of an attribute indicating execution information of the process, an attribute indicating whether or not it is an input process or an output process, and an attribute indicating a component of the controlled system which is a target of an input and an output, wherein the system control command script description is separated into a local action in which the process closes inside each of the controllers or the host and a global action which requires the process over a plurality of controllers or the host based on the attribute information, and separates the global action into the process in each of the controllers and the process by the host side according to the procedure of the system control command script description.

12. A non-transitory computer readable medium storing a program for processing a system control command script description that controls a controlled system, the program includes instructions to:

refer to system configuration information of a controlled system composed of at least a plurality of subsystems and a control device for controlling the controlled system;

separate a system control command script description for controlling the controlled system into a code for host indicating a process in a host that performs a basic process in the control system and a code for a plurality of controllers indicating a process in the controller that controls the subsystems of the controlled system, and reconstructing the system control command script description;

refer to the system configuration information, evaluating an attribute of each descriptive content of the system control command script description, and outputting attribute information thereof; and generate a combination code expressed by a process inside the host and a process in each of the controllers using the attribute information, wherein the attribute information that is output includes one or more of an attribute indicating execution information of the process, an attribute indicating whether or not it is an input process or an output process, and an attribute indicating a component of the controlled system which is a target of an input and an output, wherein the system control command script description is separated into a local action in which the process closes inside each of the controllers or the host and a global action which requires the process over a plurality of controllers or the host based on the attribute information, and separates the global action into the process in each of the controllers and the process by the host side according to the procedure of the system control command script description.

* * * * *